US009729482B2

(12) United States Patent
Liang

(10) Patent No.: US 9,729,482 B2
(45) Date of Patent: *Aug. 8, 2017

(54) MEDIA STREAMING OVER PEER TO PEER NETWORK

(71) Applicant: PayPal, Inc., San Jose, CA (US)

(72) Inventor: Sonya Rongsheng Liang, Cupertino, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/150,909

(22) Filed: May 10, 2016

(65) Prior Publication Data

US 2016/0255027 A1   Sep. 1, 2016

Related U.S. Application Data

(63) Continuation of application No. 13/914,154, filed on Jun. 10, 2013, now Pat. No. 9,363,215, which is a continuation of application No. 11/618,225, filed on Dec. 29, 2006, now Pat. No. 8,463,927.

(51) Int. Cl.
*H04L 12/58* (2006.01)
*H04L 29/08* (2006.01)

(52) U.S. Cl.
CPC .............. *H04L 51/10* (2013.01); *H04L 51/00* (2013.01); *H04L 51/08* (2013.01); *H04L 67/104* (2013.01); *H04L 67/1059* (2013.01); *H04L 67/1063* (2013.01); *H04L 67/1093* (2013.01)

(58) Field of Classification Search
None
See application file for complete search history.

(56) References Cited

U.S. PATENT DOCUMENTS

| 6,564,248 | B1* | 5/2003 | Budge | H04L 12/58 |
| | | | | 709/206 |
| 6,816,904 | B1* | 11/2004 | Ludwig | H04L 12/58 |
| | | | | 348/E7.081 |
| 2007/0016654 | A1* | 1/2007 | Bowles | G06F 21/10 |
| | | | | 709/217 |

* cited by examiner

*Primary Examiner* — Sulaiman Nooristany
(74) *Attorney, Agent, or Firm* — Maschoff Brennan

(57) ABSTRACT

Illustrated is a system and method to stream media using a peer to peer network. In some embodiments, a method includes formatting, using a video encoding protocol, audio and video data as a media stream. The method may further include verifying a recipient computer system has available memory capacity, and verifying one or more devices residing on the recipient computer system are enabled. The method may further include transmitting the media stream, using a standard Internet protocol, to the recipient computer system in response to verification that the recipient computer system has available memory space and that the one or more devices operating on the second computer system are enabled.

19 Claims, 19 Drawing Sheets

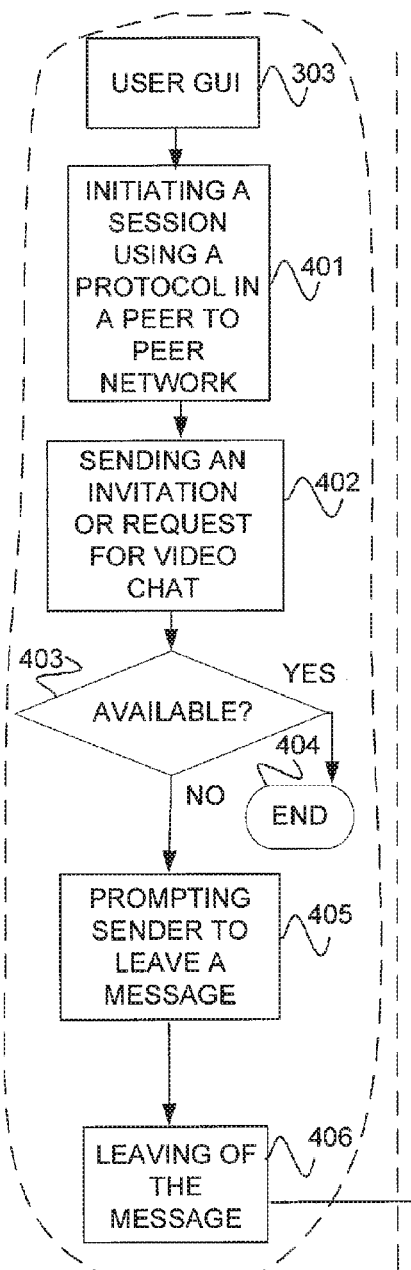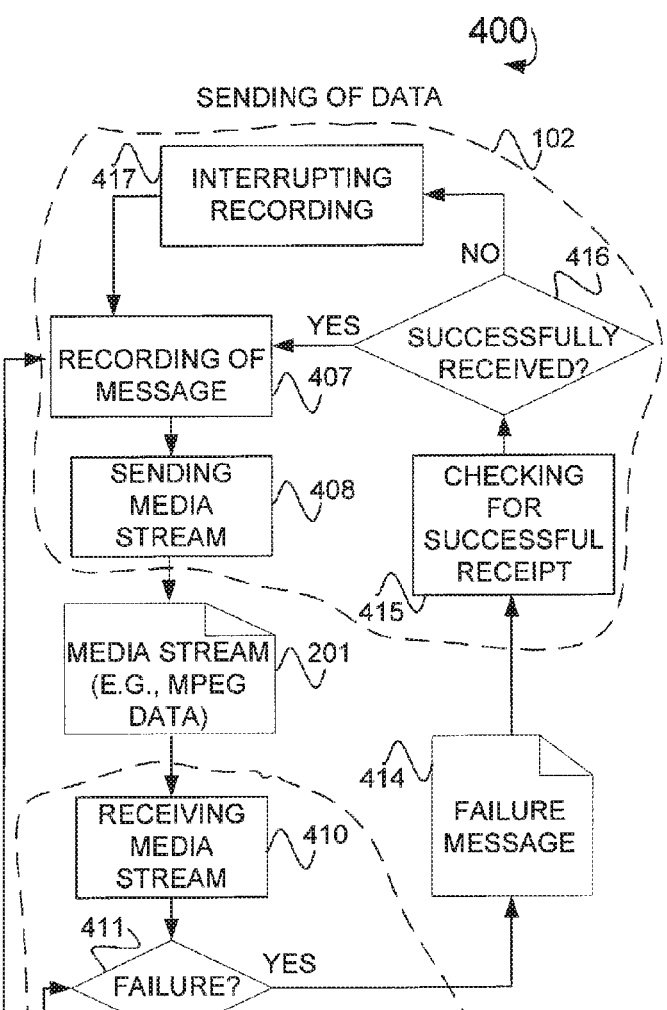
FIGURE 4

MEDIA STREAMING OVER PEER TO PEER NETWORK

CLAIM OF PRIORITY

This application is a continuation of U.S. patent application Ser. No. 13/914,154, filed on Jun. 10, 2013, which is a continuation of U.S. patent application Ser. No. 11/618,225, filed on Dec. 29, 2006; all of which are incorporated herein in their entirety.

TECHNICAL FIELD

The present application relates generally to the technical field of multimedia applications and, in one specific example, the use of a peer to peer network to facilitate video mail delivery.

BACKGROUND

Peer to peer networks come in variety of different forms. Different than computer systems configured in a server-client arrangement, where files are all centrally located, computer systems configured in a peer to peer arrangement have file systems that are distributed. The files contained in these file systems include audio/video files formatted using, for example, the Motion Picture Experts Group (MPEG) format.

BRIEF DESCRIPTION OF THE DRAWINGS

Some embodiments are illustrated by way of example and not limitation in the figures of the accompanying drawings in which:

FIG. 4 is a dual stream flowchart illustrating an example method for sending a video mail message.

DETAILED DESCRIPTION

Figure 1:
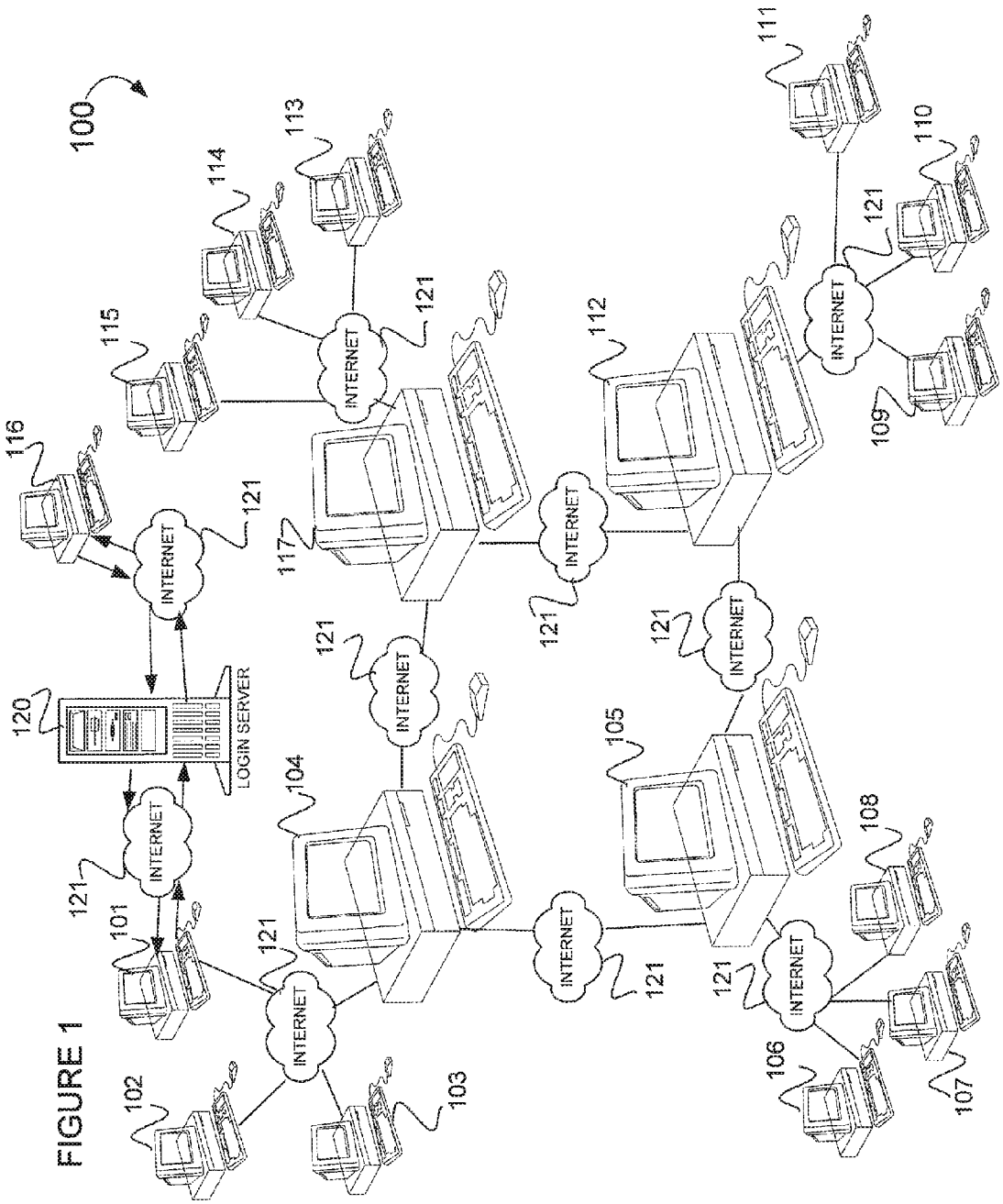
FIG. 1 is a system diagram illustrating an example peer-to-peer system.

Example methods and systems to facilitate video mail in a peer to peer network are described. In the following description, for purposes of explanation, numerous specific details are set forth in order to provide a thorough understanding of example embodiments. It will be evident, however, to one skilled in the art that the present invention may be practiced without these specific details.

One of the most popular peer to peer networks is made up of roughly three types of computer systems: an ordinary host node, a super node, and a login server. For every ordinary host node, there is a super node also known as a group leader. A peer to peer application resides on every ordinary host node and super node, allowing for one to login to the peer to peer network and to communicate with other ordinary host nodes.

When an ordinary host node (e.g., a peer) connects to the peer to peer network, the peer is assigned to one of the group leaders. After learning the Internet Protocol (IP) address of its group leader, the peer contacts its leader and informs the leader of all the content (e.g., audio/video files) it is prepared to exchange. The group leader maintains a data store, mapping names of content to IP addresses, for all of the peers that have been assigned to its group. In this way, each group becomes a mini peer to peer (P2P) file exchange system. Importantly, a group leader's data store tracks only the content within its group. A group leader is also a peer.

When a peer, say Alice, wants to find the locations of a particular object, it sends a message to its group leader. The group leader responds to Alice with a list of peers in its group that have the object. The group leader may also contact other group leaders, and ask them to send Alice the list of their peers that have the object. In this manner, by receiving lists from many group leaders, Alice obtains the IP addresses of many peers that have the desired object.

The peers and their communication relationships form an abstract, logical network called an overlay network. In graph-theoretic terms, the nodes in the overlay network are the peers; there is an edge between each peer and its group leader; and there is an edge between each pair of group leaders that directly communicate (e.g., they send messages to each other). Note that these edges are not physical communications links, but instead virtual links between peers. For example, even if a peer and its group leader are in different Internet Service Providers (ISPs) on different continents, they are directly connected by an edge in the overlay network and are therefore virtual neighbors in the overlay network.

Because peers are connecting and disconnecting all the time, including group leader peers, the overlay network is evolving and highly dynamic. In order for any peer to join an overlay network, it must establish at least one edge between itself and some other peer already in the network; that is, it must learn the IP address of some other peer in the network. To this end, the P2P file exchange system must have a bootstrapping node or multiple bootstrapping modes. When a peer wants to join the network, it first contacts the bootstrapping node. The bootstrapping node responds with the IP address of one of the group leaders, and the peer then establishes an edge with that group leader. Furthermore, when the peer initially contacts the bootstrapping node, the bootstrapping node can designate the peer as a new group leader. If a peer is a group leader, it needs to know the IP addresses of some, or all, of the other group leaders. It obtains this information as well from the bootstrapping node. Because the bootstrapping nodes are "always on" servers, peers can use Domain Name System (DNS) to locate them.

FIG. 1 is a system diagram 100 illustrating a peer-to-peer system. In some embodiments, this peer-to-peer system may be, for example, a system with a centralized design, a decentralized design or a fully distributed design. Illustrated in FIG. 1 is a decentralized design containing super nodes, ordinary host nodes, and a login server. Ordinary host nodes described herein include ordinary host nodes 101, 102, 103, 115, 114, 113, 106, 107, 108, 109, 110, 111, and an ordinary host node 116 which is illustrated herein as in the process of signing onto the system 100. Also described are various super nodes, these super nodes include super nodes 104, 105, 117 and 112. These various ordinary host nodes and super nodes are operatively coupled to one another via an internet 121. Each of the super nodes maintains IP address information in the form of a lookup table, for each of the ordinary host nodes to which it is connected. In order for a super node or ordinary host node to log onto the system 100 a login server 120 may be used to validate the signifier of an ordinary host node which is attempting to log on to the system 100.

Figure 2:
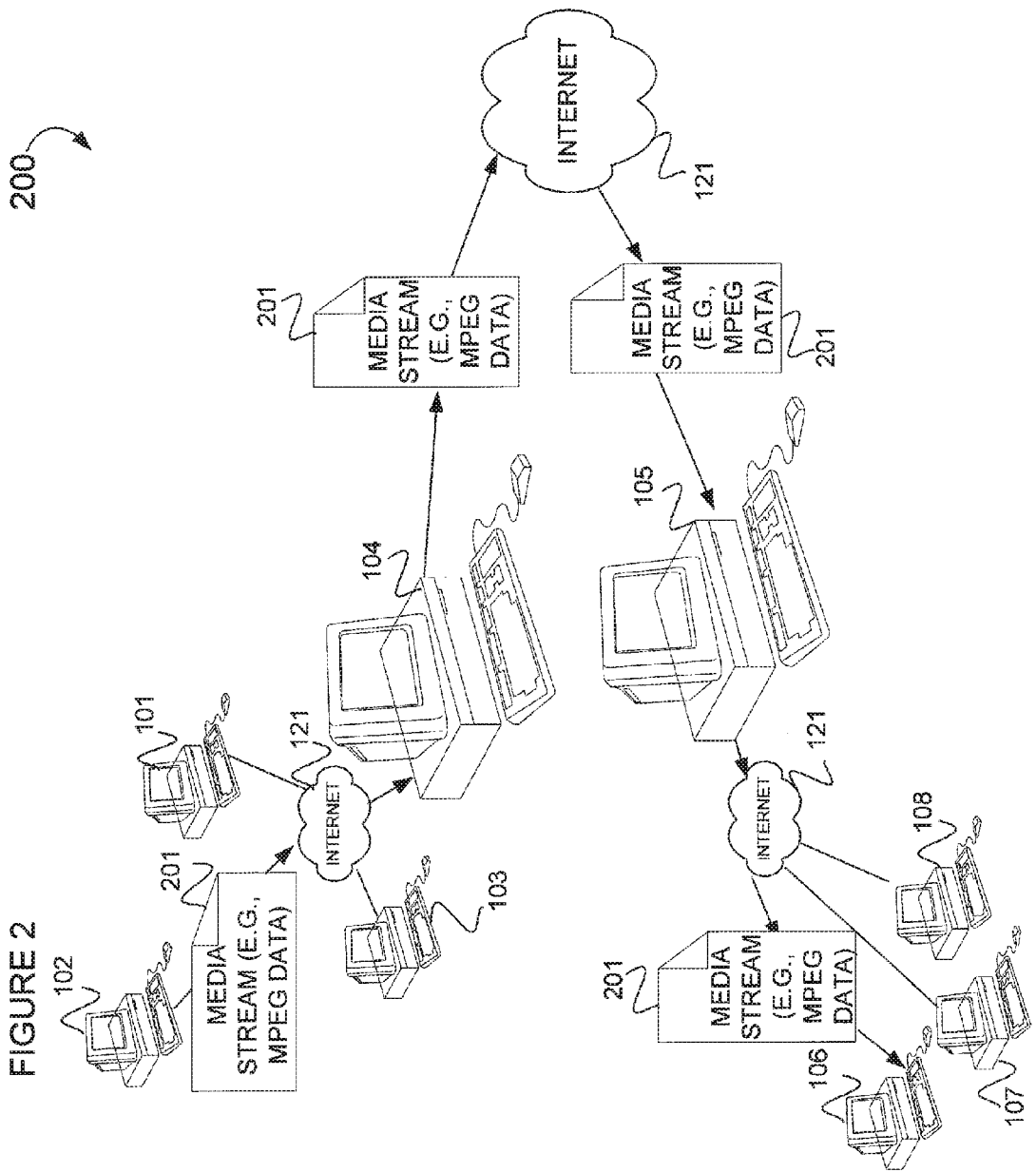
FIG. 2 is a system diagram illustrating an example exchange of data in the form of a media stream between a first ordinary host node and a second ordinary host node.

FIG. 2 is a system diagram 200 illustrating an exchange of data in the form of a media stream 201 between an ordinary host node 102 and an ordinary host node 106. Illustrated is a media stream 201 in the form of, for example, an MPEG data packet being transferred through or via an internet 121 to a super node 104. Once received by the super node 104, the super node 104 conducts a look-up to determine what is the IP address or location of the recipient of the media stream 201. After this look-up is complete, the super node 104 transmits the media stream 201 via an internet 121 to a super node 105 to which the ordinary host node 106 is operatively coupled. Once received by the super node 105, the media stream 201 is transmitted to the ordinary host node 106. In some embodiments, once the media stream 201 is sent from the super node 105 to the ordinary host node 106, a virtual connection is created between the ordinary host node 102 and ordinary host node 106.

Figure 3:
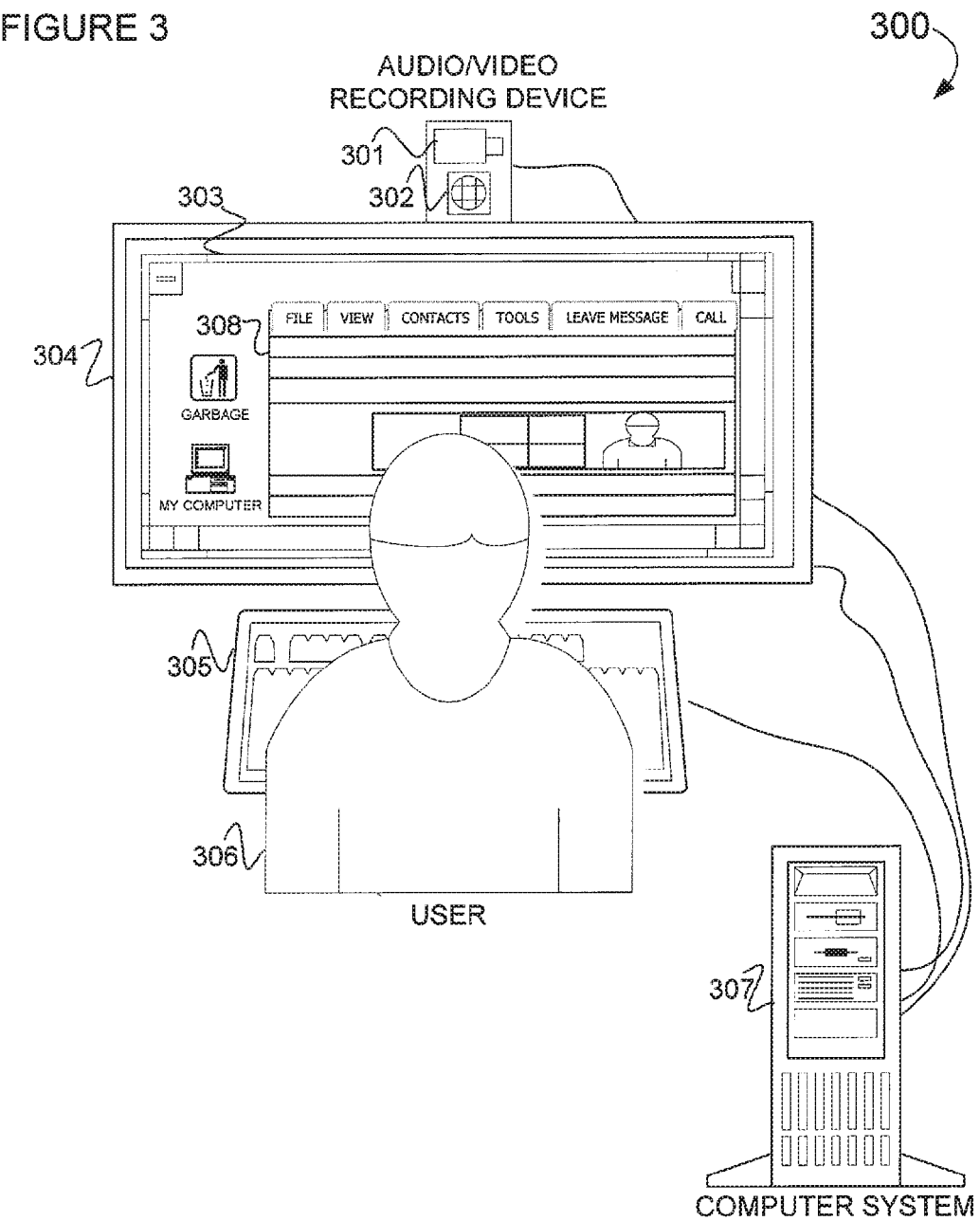
FIG. 3 is a system diagram illustrating an example a user interacting with a Graphical User Interface (GUI) for the purposes of generating a media stream.

FIG. 3 is a system diagram 300 illustrating a user interacting with a GUI for the purposes of generating a media stream 201. Illustrated is an audio/video recording device with a camera 301 and a microphone 302 that allow for a user 306 to generate audio and video data which is then formatted into a media stream 201 utilizing, for example, an MPEG format. This media stream 201, as previously described, is then sent from the ordinary host node 102 to the ordinary host node 106. In the course of generating this audio and video data, a user 306 may utilize a keyboard 305 as an input device to input data into one of many fields contained in a peer-to-peer client application GUI 308. This peer-to-peer client application GUI 308 in many cases appears within a window or frame 303 on a computer screen 304. The process of generating audio and video data includes utilizing a computer system 307. In many cases, various ordinary host nodes (e.g., 102, 104, 106, 105, 117, and 121) utilize a peer-to-peer client application GUI such as 308 to generate audio and video data, and to view audio and video data as an MPEG formatted media stream 201. This audio and video data may include video mail. In some cases, this video mail will be generated and received by various computer systems such as 307 that serve either as an ordinary host node or a super node.

A Three-Tier Architecture

In some embodiments, one implementation may be as a distributed or non-distributed software application designed under a three-tier software architecture paradigm, whereby the various modules of computer code that make up the one implementation can be categorized as belonging to one or more of these tiers. A three-tier architecture is well known in the art. The first tier is an interface level that is relatively free of application processing. The second tier is a logic level that performs processing in the form of logical/mathematical manipulations (Logical Manipulations) of data inputted through the interface level, and communicates the results of these Logical manipulations with the Interface and/or backend or storage level. Some example embodiments may include these Logical Manipulations relating to certain business rules or tasks that govern the application as a whole. These logical manipulations and associated business rules are used to initiate an audio/video session across a peer to peer network, generate a media stream, and save this media stream as a video mail message. The third tier or storage level is a permanent storage medium or, in some example embodiments, may include non-permanent storage medium. One or more of these tiers may be collapsed into one another, resulting in a two-tier architecture or one-tier architecture. For example, the Interface and logic levels may be consolidated, or the Logic and storage level may be consolidated, as in the case of an application with an embedded database. This three-tier architecture may be implemented using one technology, or as will be discussed below, a variety of technologies. These technologies may include one or more object-oriented programming languages such as, for example, JAVA™, C++, DELPHI™, C#™, or the like. Additionally, structured programming languages such as, for example, C may also be used. Moreover, scripting languages such as, for example, Perl, Python, PHP, JavaScript or VBScript may also be used. This three-tier architecture, and the technologies through which it is implemented can be implemented in two or more computers organized in a server-client relationship, as is well known in the art, such that an interface level resides on a client computer, whereas a logic level resides on the application server (see below) and the storage level resides on a database server (see below). As will be discussed more fully below, in such a relationship these three tiers can be implemented as various software components that communicate via distributed programming protocols. Some example embodiments may include these three tiers being implemented in a peer-to-peer configuration, or some other suitable file exchange paradigm, such that all three tiers reside on one or more computers and each computer retrieves files and data from one another. Peer to peer configurations are well known in the art.

FIG. 4 is a dual stream flowchart illustrating a method 400 for sending a video mail message wherein a first stream is titled initiation of session, and a second stream is titled sending of data. With regard to the first stream, various modules including software and/or hardware modules reside on an ordinary host node 102. The first of these modules, is a module 303 that executes a user GUI allowing a user to generate and receive audio and video data. Next, a module 401 serves to initiate a session for the transmission of a media stream 201 using a protocol in combination with a peer-to-peer network. This session can be initiated using any number of protocols that are known of the art such as, for example, a Session Initiation Protocol (SIP). Once the session is initiated, a module 402 sends an invitation or request for a video chat. Upon sending this invitation, a decisional module 403 determines whether or not the recipient of the invitation is available. If the recipient is available, then an ending step 404 is initiated wherein the sender and the recipient engage in video chat utilizing the aforementioned peer to peer client application GUI 308. In cases where the recipient is not available, a module 405 will be executed wherein the sender or initiator of the session will be prompted to leave a message. Next, in some cases, a module 406 will request that the initiator or sender of the media stream 201 leave a message with regard to the actual sending of the message.

The second stream of the dual stream flowchart illustrates the actual sending of data. Described are various modules residing on the previously mentioned ordinary host node 102. These modules include a module 407 that facilitates the recording of the audio and video message via capturing such data using the camera 301 and microphone 302. This captured data is then encapsulated via the module 408 using one of the aforementioned protocols such as MPEG and sent as a media stream 201. Additional protocols utilized in the encapsulation process may include a Real-time Transfer Protocol (RTP), a User Datagram Protocol (UDP), and an Internet Protocol (IP). Once encapsulated, and transmitted via the module 408, the media stream 201 is sent to, for example, an ordinary host node 106. Upon receipt at the ordinary host node 106, a module 410 receives, parses and decodes the media stream 201 for the purposes of storing the media stream or data as a video mail message. Once received, a decisional module 411 determines whether or not the storage of the video mail message has been successful. This decisional module 411 determines, for example, whether or not the storage has failed. If no failure has occurred, then a module 412 stores the media stream to a native database 413. If a failure has occurred, a failure message 414 is sent to a module 415 which checks for the successful receipt of the media stream 201. This module 415 residing, for example, on an ordinary host node 102, will then send the failure message to a decisional module 416 which determines whether or not a failure has been received by virtue of receiving a message from the module 415. If decisional module 416 determines that a failure message has been received, then a signal will be sent to a module 417 instructing the module 417 to interrupt the previously described module 407, and in effect, interrupt the recording of the message. If, however, a failure message 414 has not been received, then the decisional module 416 will deem the recording successful and the module 407 will continue to receive an audio video data, converting that into a media stream 201 for future use.

An Interface Level

An example embodiment uses a GUI in conjunction with a peer to peer client application. Some example embodiments may include an Application Programming Interface (API) implemented to allow two or more peer to peer client applications to communicate with one another. This peer to peer client application may reside on a computer system and be part of a peer to peer network as an ordinary host node or a super node. A well-known peer to peer client application is GNUTELLA™ or some other suitable peer to peer client application.

The interface for this peer to peer client application may be implemented, for example, using a Java Applet, or VBScript or C# form. These forms contain objects such as text boxes, buttons, scroll-down bars, widgets, or some other suitable dynamic interface object. These objects, and the routines governing them, allow a user to retrieve, input, or delete content, just to name few of the functions. For example, in some embodiments, Structured Query Language (SQL) calls (see below) are embedded into the code underlying the form such that data can be stored or retrieved from a database automatically, using the form. Some further embodiments may include a user being prompted with a text box into which is entered login information. This text box may reside on the peer to peer client application. Once the login information is provided, it is sent into a login server 120 for user verification.

In some embodiments, the peer to peer client application utilizes various GUIs and APIs such that a receiver of a video mail message is able to receive the video mail message even where they are not present. A receiver of such a video mail message may be able to receive the message by denoting a non-availability status to the sender, or by informing the sender that they are not available due to the expiration of a certain period of time. With regard to the non-availability status, a receiver may set their status through the use of a displayable icon (e.g., an emoticon), a text message, or other suitable way to put a sender on notice as to their status. A receiver may also be able to set a predetermined time limit during which the receiver is able to respond to an invitation or request for video chat. In cases where this time period expires, the sender may be allowed to leave a video mail message. In some example cases, a receiver may be given 30 seconds, 40 seconds, 60 seconds or some other suitable period of time during which the receiver may respond to the invitation or request for a video chat. This time period may be set by the receiver.

Figure 5:
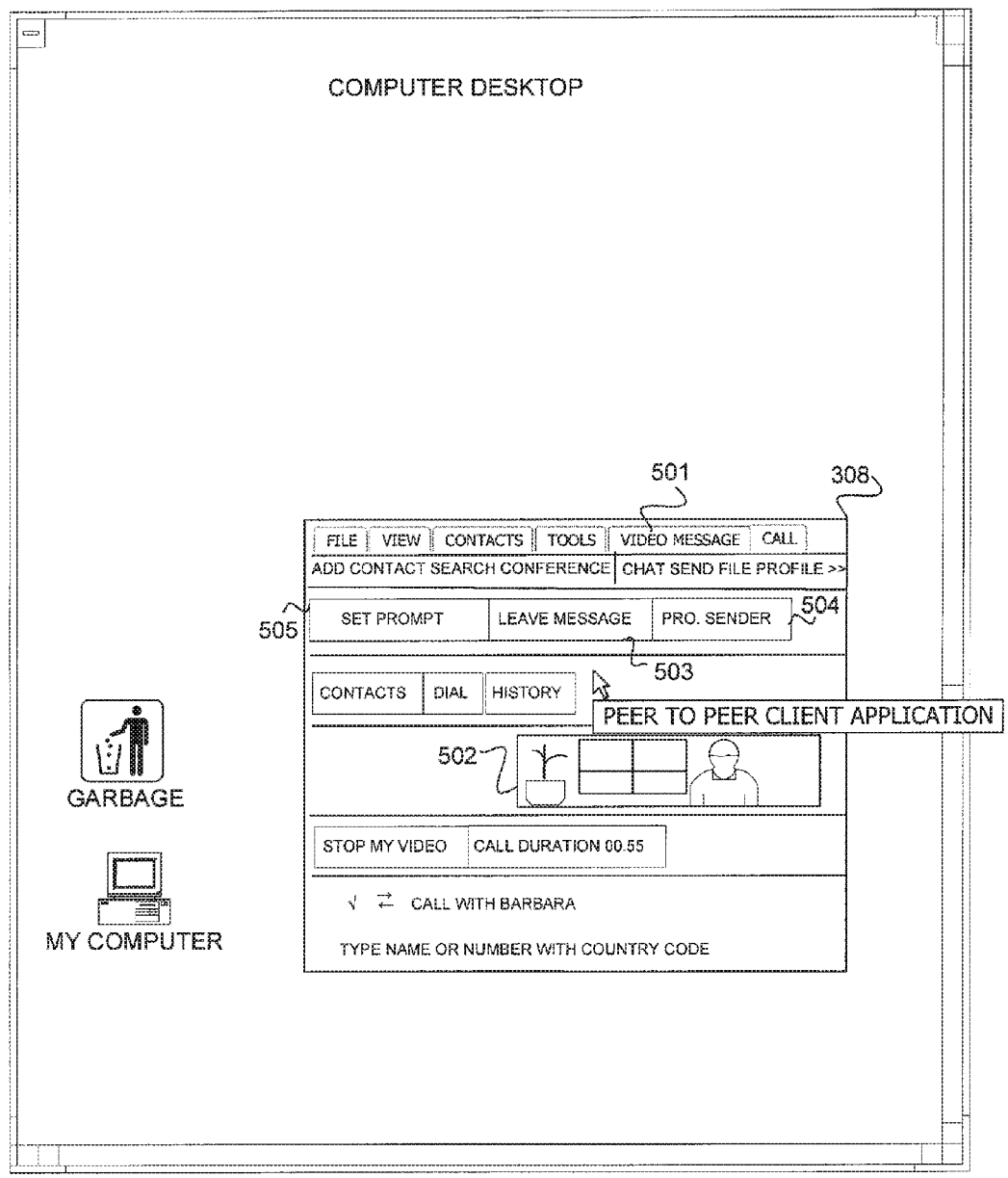
FIG. 5 is an illustration of an example peer to peer client application GUI.

FIG. 5 is an illustration of a GUI 303. Described is a peer-to-peer client application GUI 308 with a screen tab 501 used to select a video mail option or functionality that is apart of the peer-to-peer client application, a set prompt button 505, a leave message button 503, and a prohibited sender button 504. A window 502 is also illustrated. These various tabs, buttons and windows may be implemented using any number of screen objects or widgets as are known in the art.

Figure 6:
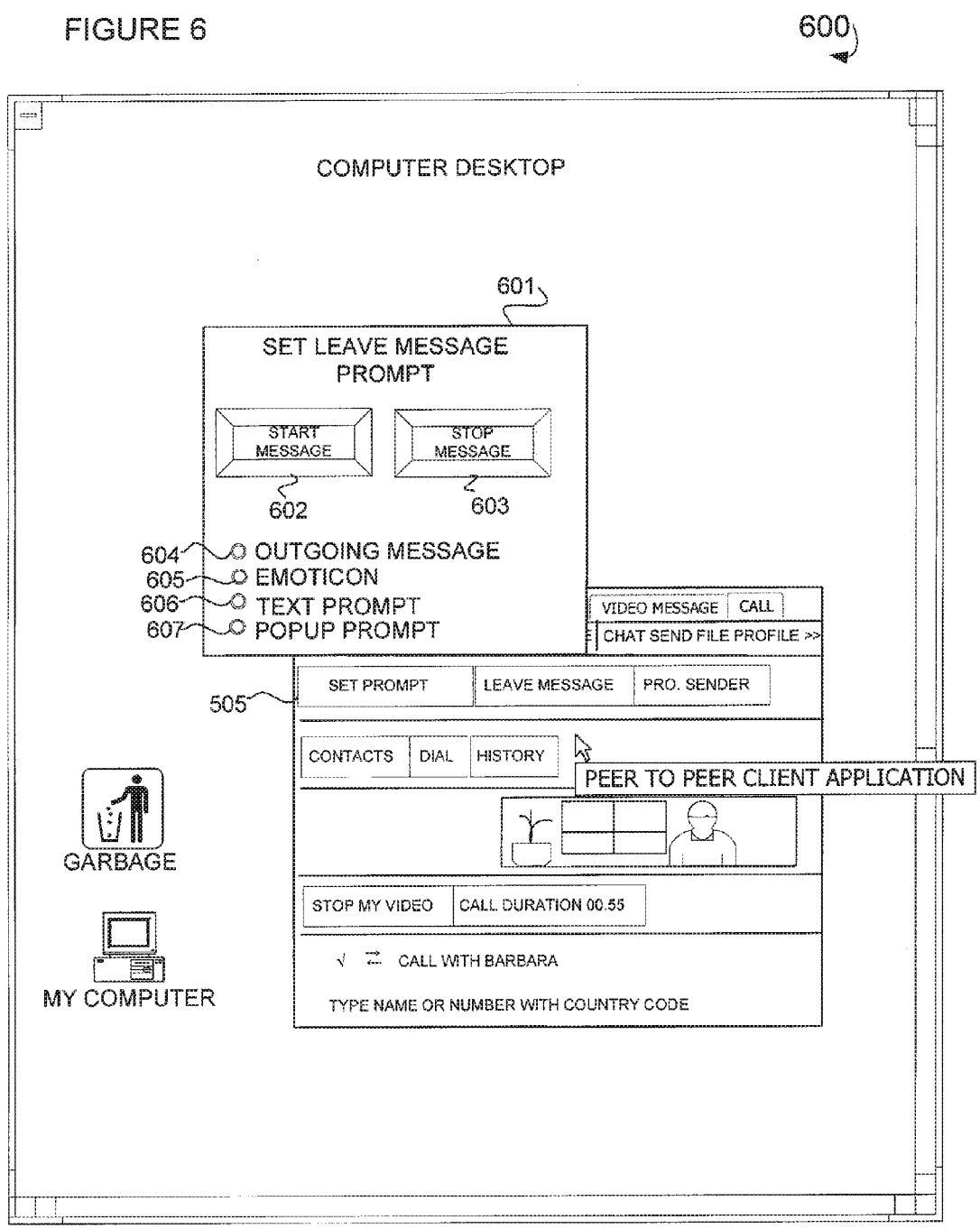
FIG. 6 is an illustration of a GUI used for a video mail set up.

FIG. 6 is a GUI 600 describing a video mail set up GUI 601. In some embodiments, a user selecting a button 505 is allowed to set up the type of prompt that a potential sender or initiator of a video mail message session would see or receive should the receiver of the video mail message be unable to take, for example, a video call. For example, a receiver of a video mail message may be able to prompt the sender with their own outgoing video mail message using, for example, a screen object or widget in the form of a button 602. Specifically, by pressing a button 602, the previously described camera 301 and microphone 302 may be used to record audio and video data, while a button 603 allows the user to stop or cease the recording of this outgoing video message. In addition to being able to prompt a sender with an outgoing message, a radio button 604 or other types of prompts may be generated including the use of an emoticon to describe or inform a sender of a video mail message that the recipient is unavailable. This emoticon option can be set using the radio buttons 605. Further, a text prompt could be set using a radio button 606, wherein the recipient of a video message who is unavailable may be able to prompt the sender with text stating that he or she is unavailable to receive a video message. In addition, a pop up prompt may be set using radio button 607, wherein the sender or initiator of the video mail session may be prompted with a pop up menu stating that the recipient of the video mail message is unavailable.

Figure 7:
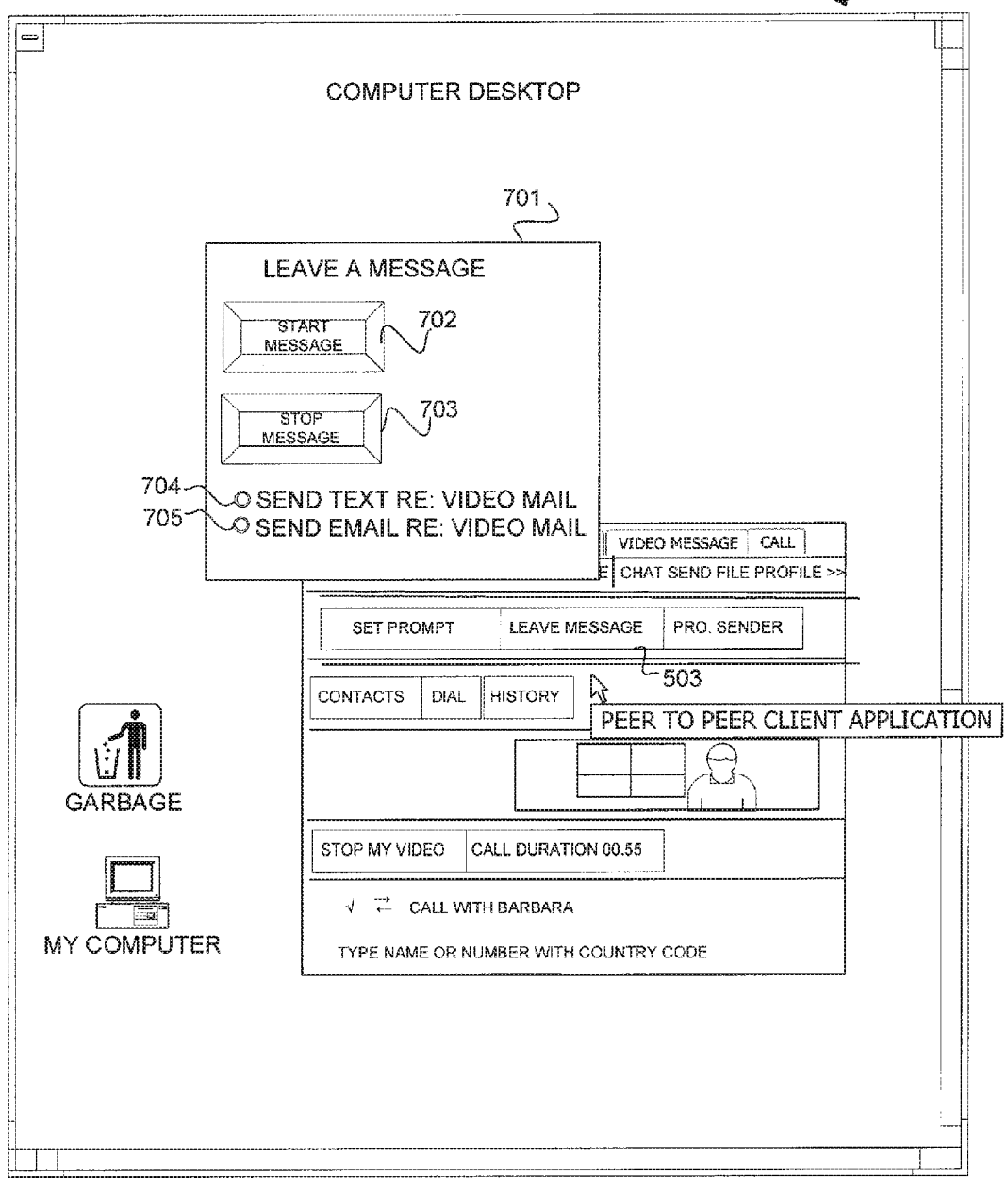
FIG. 7 is a GUI illustrating an example pop up message instructing senders to leave a message.

FIG. 7 is a GUI 700 illustrating a pop up message 701, wherein a potential sender or initiator of a video mail session is prompted to leave a video mail message. Illustrated is a screen object or widget 702, in the form of a start message button and a screen object or widget 703 in the form of a stop message button. By using the start message button 702 and stop message button 703, a sender or initiator of a video mail session may utilize the aforementioned camera 301 and microphone 302 to start and stop the recording of a video mail message. Also illustrated are a radio button 704 and a radio button 705. If radio button 704 is selected, the initiator or sender of the video mail message may send a text message to the recipient informing them that a video mail message has been left for them. Similarly, the radio button 705 allows an initiator or sender of a video mail message to send an email notice or notification to the recipient that a video mail message has been left for them.

Figure 8:
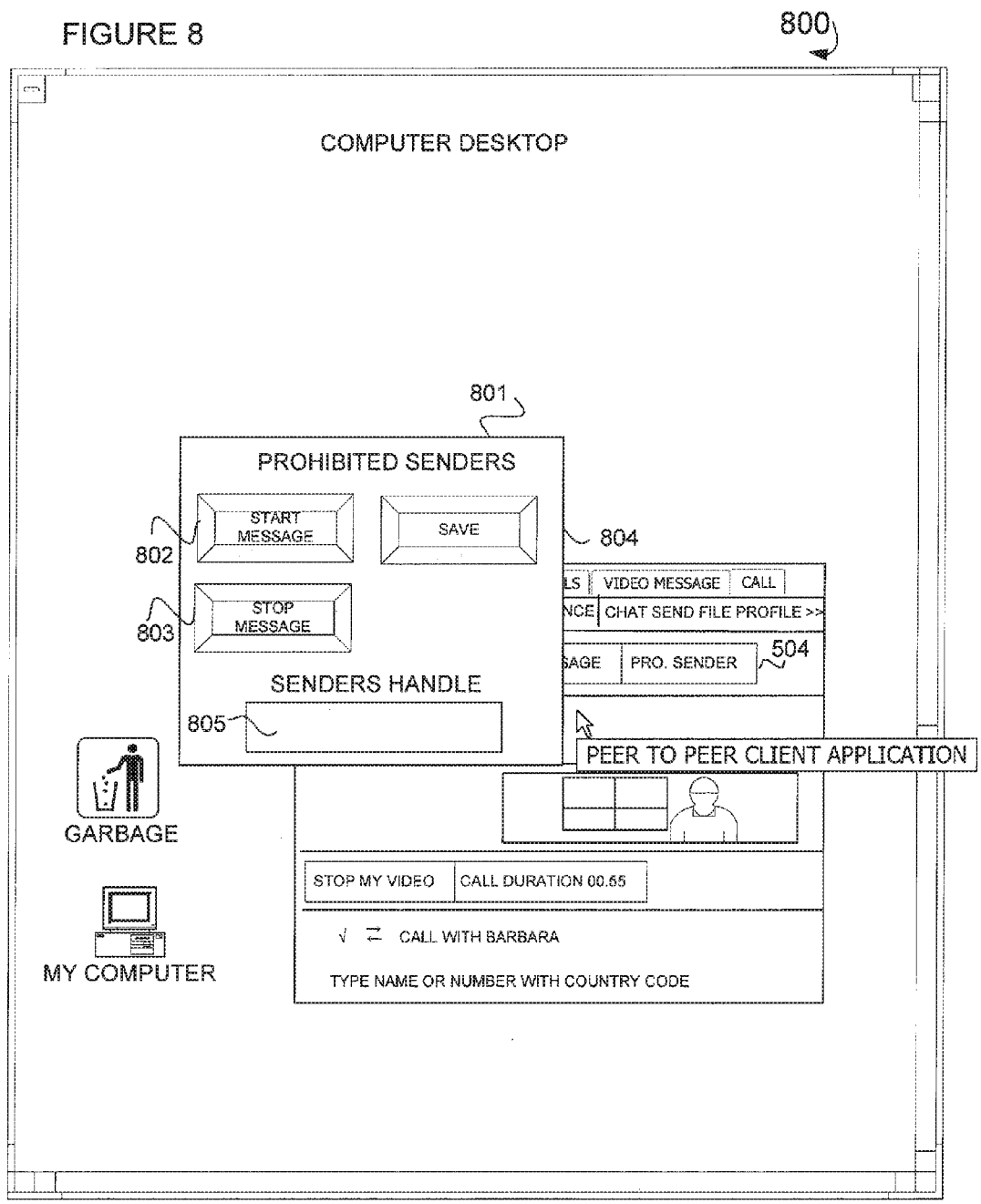
FIG. 8 is a GUI illustrating an example pop up form that allows a recipient to generate a prohibited senders list.

FIG. 8 is a GUI 800 wherein a pop up form 801 allows a recipient of an email message to generate a prohibited senders list and, in some cases, allows them to generate an outgoing message to the prohibited sender. Illustrated is a screen object or widget 802 in the form of a start message button and a screen object or widget 803 in the form of a stop message button. As previously described, these start message and stop message buttons (e.g., 802 and 803) allow a generator of a video mail message, using the aforementioned camera 301 and microphone 302, and to record this message and to stop recording this message. Also described is a screen object or widget 804 in the form of a save button that allows a user to save an outgoing video mail message to a prohibited sender. Further described is a text box 805 into which a user may enter the identification or sender handle of a particular party, and then save this handle using the aforementioned button 804 into a list of prohibited senders. With regard to the outgoing message to a prohibited sender, a user may, for example, record a message stating "do not contact me" or some other cautionary message to instruct an initiator or sender of a video mail message not to contact nor have further interaction with the user.

In some embodiments, various video receiver and sender APIs may be implemented to facilitate the creation and delivery of video mail. For example, a video recorder function (e.g., "int videoRecoder(String callerId, CommunicationHandler handler)") may take an argument in the form of the ID (e.g., handle) of the sender of the video mail, and an argument representing the video mail or media stream 201 session. Once these arguments are received and processed, a return value such as an integer representing the various levels of success may be returned. For example, a return value of 0 denotes the establishment of a successful session, while −1 represents that a caller is not allowed (e.g., prohibited sender), −2 represents a failure of disc space on the receiver's computer system, and a −3 represents exceeding the maximum number of messages. As described below, additional sub processes or functions are called within this video recorder function.

In some embodiments, a security check function (e.g., "int securityCheck(String callerId)") is called by the video recorder function such that if the callerId argument is on the allowed list, then a valid value is returned (e.g., 0), or if the callerId is not valid, then an invalid value (e.g., 1) is returned. Some example embodiments may include a reference (i.e., a pointer) to an outgoing message file being returned in those cases where the callerId value is invalid. As described below, this message may be specially tailored for the sender of the video mail message or the initiator of the video mail session.

Moreover, in some example embodiments, a disc space function (e.g., "int discSpaceCheck( )") is called by the video recorder function and where ample disc space exists, a valid value (e.g., 0) may be returned, and where ample disc space does not exist, an invalid value (e.g., 1) may be returned. The notion of whether the available disc space is ample or not may be based upon certain considerations set by the potential recipient of the video mail message. The actual checking of disc space may be carried out by, for example, checking the current allocated space available on the recipient's computer system against some preset video mail file size value. Alternatively, available disc space may, for example, be determined through reading a configuration setting file (e.g., written/edited by the installation/configuration API), and checking it against a local recording status file (e.g., modified by Video Recording API and Video Mail Manager API), wherein the configuration setting file contains the aforementioned predetermined limits, and the local recording status file contains the current disc space usage values. In some embodiments, the configuration setting file and the local recording status file may be written in an Extensible Markup Language (XML), or may be a flat file using delimiters to distinguish data.

For example, in some cases, once the callerId and the disc space are verified, then the media stream 201 session is initiated such that an acknowledgement of the session is sent to the sender by the receiver so a session may begin. This can be accomplished via a message send function (e.g., "int messageSend(int inviteRecording)"), whereby, for example, a return value of 0 is an acknowledgement by the receiver to initiate a media stream 201 session, and a return value of 1 denotes that the media session should not be initiated. For example, if sender's response is quitting out, the peer-to-peer client application should release any buffer created to receive the media stream 201, and the receiving application (e.g., module 410) stopped. If the receiver acknowledges the return value and the sender's response is to start recording (see below), then the receiver will start to store the media stream 201 into a buffer.

Some example embodiments may include a function to receive and store a media stream 201. For example, a recording function (e.g., "int recording(VideoStream stream)") may be implemented such that when the media stream 201 is received from a peer to peer network, a buffer will have been allocated to store this media stream 201 up to a certain size, and once this size is achieved, the media stream 201 residing in the buffer will be written to a disc or some other type of permanent storage media. During the course of recording, a checking method will be executed to determine, for example, whether disc space is running out, or if the maximum length of video message has been reached while writing to disc. The recording function will continue to execute until a message is received to stop recording. Once the message is stopped and saved, the above described recording status file will be updated to add number of saved messages, and the status of the message (e.g., new). In some cases, if one of these event occurs (e.g., the disc space is exceeded), then the record function will cease writing to the disc and a message will be sent to the sender that the disc is full or that the maximum length is reached.

In some embodiments, on the sender's side, when the sender receives the invite to initiate the media stream 201, the user will see a message pop up (e.g., 701) with a button (e.g., 702) or other screen object or widget to start recording. This is implemented though a caller side video-recording-sender API. In some cases, where the button is executed, a message send function (e.g., "int messageSend(startRecording)") is executed, and a media stream 201 sent by .a module 408 and received by a module 410. This function receives a value denoting the need to start a recording and returns a value denoting the continuing (e.g., 0) or ending (e.g., 1) of a recording. However, if the user chooses to quit, a quit out message will be send through the messageSend function. When user finishes the recording, there may be a button (e.g., 703) or other screen object or widget for a user to click to stop recording. Once the button (e.g., 703) is clicked, a message of stop recording is sent to module 415. The logic underlying these various functions and the modules executing this logic is described below.

Logic Level

In some example embodiments, a GUI is implemented using an object oriented programming language such as C++, JAVA™, DELPHI™, C#™ or some other suitable programming language. Some example embodiments may include a structured programming language such as C to implement the logic level. This GUI may be located on a remote computer connected to another computer, in a client-server, peer-to-peer or some other suitable configuration. In some example embodiments, the routine written in, for example, C, will retrieve data from a storage, data structure, or database level. Some example embodiments may include the storage level being run by a separate database application, while in other embodiments a database embedded with a logic level will be implemented. This separate database application will be located remotely on a separate computer system; in other example embodiments, it will be located in the same computer.

Figure 9:
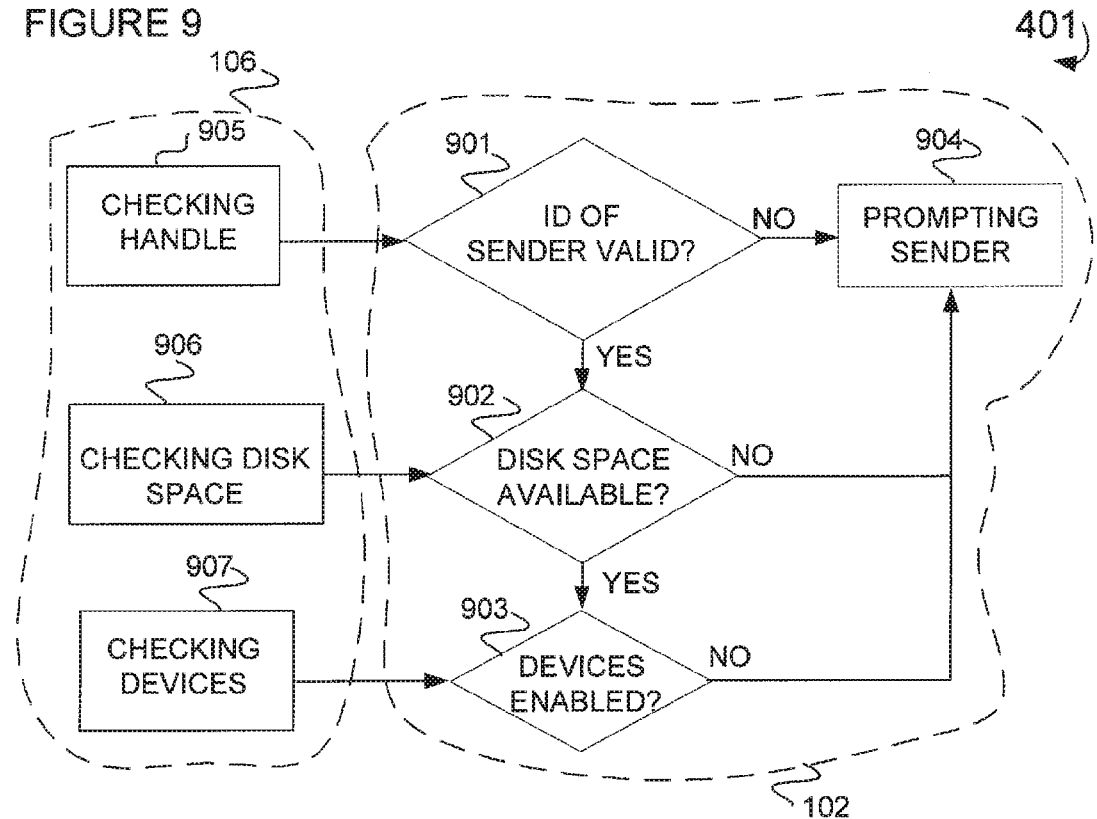
FIG. 9 is a flowchart illustrating an example method used to implement a module used to initiate a peer to peer video session.

FIG. 9 is a flowchart illustrating an example method used to implement module 401. This method includes a module 905 titled checking handle, a module 906 titled checking disc space, and a module 907 titled checking the devices. These three modules (e.g., 905, 906, 907), in some cases, reside on an ordinary host node 106. With regard to the module 905, this module, in some cases, checks to determine whether or not the initiator or sender of a video mail message is allowed to send a video mail message to the recipient ordinary host node 106. For example, the initiator or sender of the video mail message may be a prohibited sender. As to the module 906, it may be used to check the available amount of disc space to determine whether or not disc space is available to receive a video mail message at the ordinary host node 106. As to the module 907, in some cases, various peripheral devices may be necessary to receive a video mail message, and module 907 checks the availability of these devices. A decisional module 901, residing on an ordinary host node 102, receives a signal from the module 905 and determines whether the ID of the sender is valid. If decisional module 901 evaluates to valid, then subsequent decisional modules are executed. If it is not valid, then a module 904 prompts the initiator or sender that their ID is not valid, and hence they will be unable to send a video mail message to, for example, the ordinary host node 106.

After the decisional module 901 is executed, a decisional module 902 residing on an ordinary host node 102 is executed, wherein a message from the module 906 is received and a determination made as to whether disc space is available. If disc space is not available, then again the module 904 is executed, prompting the sender this time that disc space is not available on the ordinary host node 106. If disc space is determined to be available by the decisional module 902, then decisional module 903 residing on an ordinary host node 102 is executed, wherein the message from the module 907 is processed to determine whether or not all requisite devices are enabled. If all requisite devices are enabled, then the video mail message process is allowed to proceed. If the decisional module 903 evaluates to false (e.g., "no"), then again a module 904 is executed to inform the sender that all requisite devices have not been enabled and that the video mail message could not be sent or left. The use of ordinary host node 102 and 106 are merely examples and accordingly other combinations of ordinary host nodes such as, for example, 116 and 108, 103 and 109 or some other combination may be used in lieu of the example of 102 and 106.

Figure 10:
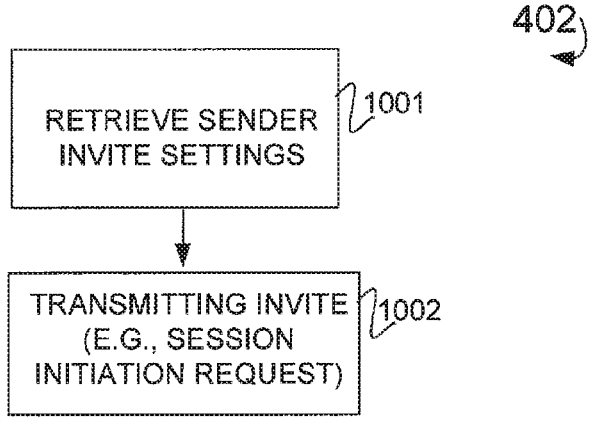
FIG. 10 is a flowchart illustrating an example method used to implement a module used to send an invite request for a video session.

FIG. 10 is a flowchart depicting an example method used to implement the module 402. In some embodiments, a module 1001 retrieves a sender invite settings. These invite settings, which are set via, for example, the GUI 601 include the use of emoticons, outgoing video mail messages, text prompts and/or a pop up prompt. Once the module 1001 is executed to retrieve a users invite settings, a module 1002 is executed to transmit these invite settings from, for example, an ordinary host node 106 to an ordinary host node 102.

Figure 11:
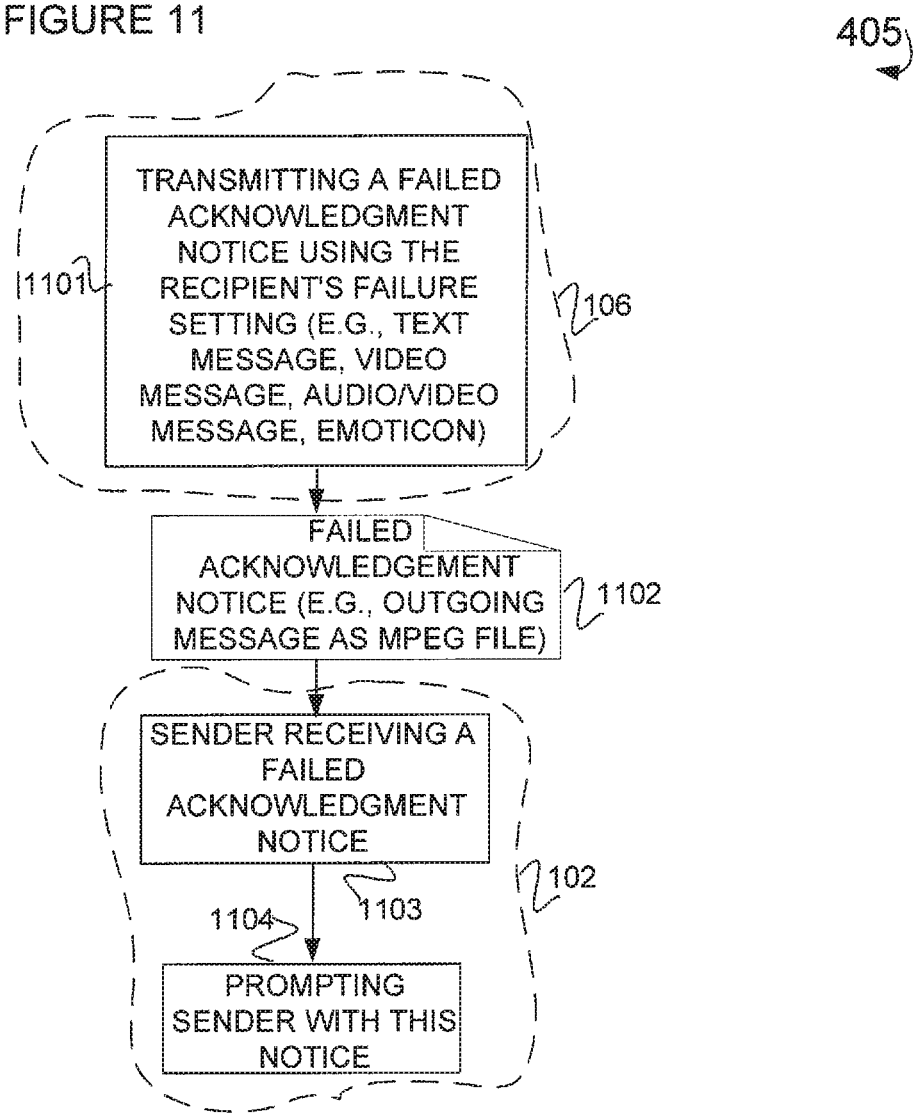
FIG. 11 is a flowchart illustrating an example method for implementing a module used to prompt a sender to leave a message.

FIG. 11 is a flowchart illustrating an example method for implementing module 405. In some embodiments, a module 1101 residing on, for example, an ordinary host node 106 is executed. This module 1101 transmits a failed acknowledgement notice using the recipient's failure setting, for example, text message, outgoing video message, emoticons or the like. It transmits this failed acknowledgement notice to, for example, an ordinary host node 102. This failed acknowledgement notice such as, for example, failed acknowledgement notice 1102, may be transmitted as an outgoing MPEG file from, for example, the ordinary host node 106. In some cases, a module 1103 may receive the failed acknowledgement notice 1102 and, in turn, forward this notice to module 1104 that prompts a sender or initiator of the video mail message with the notice 1102. Put another way, in some cases, a initiator or sender of a video mail message may initiate a session, and where the recipient is unavailable, a failed acknowledgement notice 1102 will be sent back to the initiator or sender of the video mail message to put them on notice that a video mail message must be left.

Figure 12:
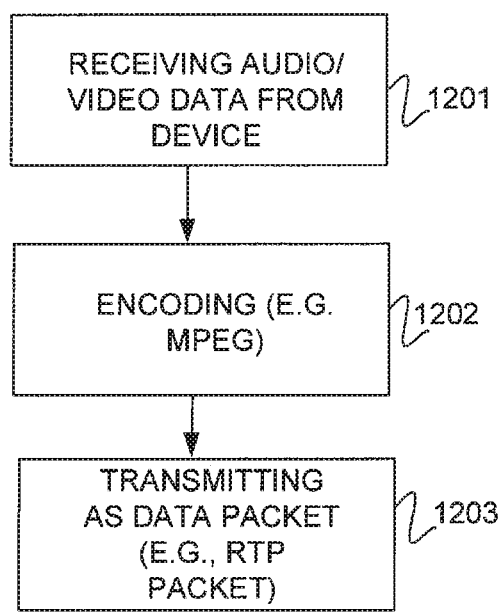
FIG. 12 is a flowchart illustrating an example method implementing a module to record a message.

FIG. 12 is a flowchart illustrating an example method implementing module 407. Illustrated is a module 1201 that receives audio video data from a device including, for example, a camera 301 and/or microphone 302. Once this audio and video data is received by the device, a module 1202 is executed that encodes the audio video data using some type of encoded format such as MPEG. Next, a module 1203 may be executed that actually transmits the encoded data as a media stream 201 containing a data packet utilizing the above described protocols such as RTP used in conjunction with, for example, a UDP/IP protocol.

Figure 13:
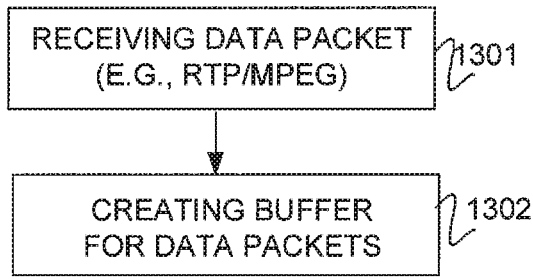
FIG. 13 is a flowchart illustrating an example method to implement a module to receive a media stream.

FIG. 13 is a flowchart illustrating an example method to implement module 410. Described is a module 1301 that receives a media stream and, in particular, a data packet contained in a media stream. Next, in some cases, a module 1302 is executed that creates a buffer for these received data packets.

Figure 14:
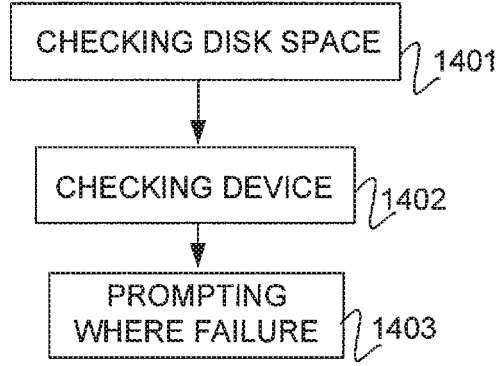
FIG. 14 is a flowchart illustrating an example method to implement a decisional module to determine whether a failure has occurred.

FIG. 14 is a flowchart illustrating an example method to implement the module 411. Described is a module 1401 that checks the disc space on the recipient ordinary host node (e.g., 106). Once disc space is verified, then a module 1402 is executed to make sure that any peripheral devices that are needed are working, and where there is a failure in either the checking process of 1401 or 1402, a module 1403 is executed to prompt one of the failure of these devices or disc space.

Figure 15:
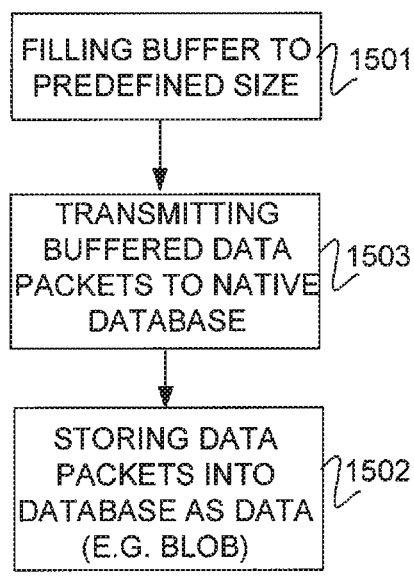
FIG. 15 is a flowchart illustrating an example method to implement a module for storing a media stream to a database.

FIG. 15 is a flowchart illustrating an example method to implement a module 412. Described is a module 1501, wherein a buffer containing audio and video data packets is initialized, the data packets sent to this buffer, and the buffer filled to some predetermined size. Once the buffer is filled to a predetermined size, then a module 1503 is executed wherein the audio and video data contained in its buffer is transmitted to a native database such as native database 413. Once transmitted, a module 1502 is executed that formats the data into some type of format for storage on to the native database 413. This type of format may include, for example, the Binary Large Object (BLOB) format, or some other type of data type format.

Figure 16:
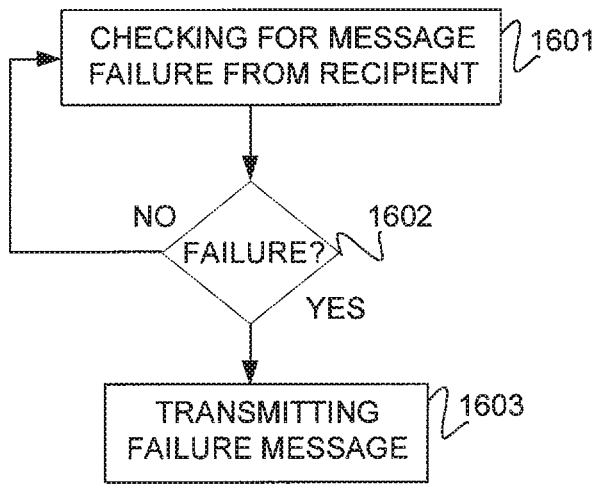
FIG. 16 is a flowchart illustrating an example method to implement a module used to check for the successful receipt of a media stream and the packets contained therein.

FIG. 16 is a flowchart illustrating an example method to implement a module 415. Described is a module 1601 that checks for a message failure notice (e.g., a signal) from the recipient of the video mail message. Next, a decisional module 1602 is executed wherein if there is no failure notice, then the module 1601 is executed again such that a loop is created wherein the module 1601 is constantly checking for a message failure notice from the recipient of the video mail message. If a message failure notice is received, then a module 1603 is executed wherein a message failure notice, such as the previously described failure message 414, is sent from, for example, the ordinary host node 106 to the ordinary host node 102 where the sender is generating the video mail message.

Figure 17:
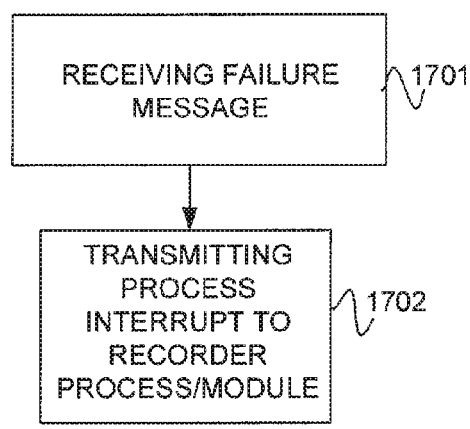
FIG. 17 is a flowchart illustrating an example method to implement a module to receive a signal regarding a message failure and transmit an interrupt to a recording module to stop the recording module from recording.

FIG. 17 is a flowchart illustrating an example method to implement a module 417. Illustrated is a module 1701 that receives a failure message wherein the failure message may, for example, be the previously described failure message 414. Once the module 1701 receives a failure message, a module 1702 is executed wherein a process interrupt signal or message is transmitted to a recorder or processing module such as, for example, the module 407. The purpose of this interrupt signal or message is to interrupt the recording of the video message when there is some type of failure that occurs on the ordinary host node 106. This failure may include the non-availability of disc space, failure of a peripheral device or some other type of failure.

Storage Level

Some embodiments may include a storage level that is implemented whereby tables of data are created, and data is inserted into, and/or selected from, these tables using SQL or some other database-related language known in the art. These tables of data can be managed using a database application such as, for example, MYSQL™, SQLSERVER™, Oracle 8I™ or 10G™, or some other suitable database application. These tables are organized into an RDS or Object-Relational-Database Schemas (ORDS), as is known in the art. These schemas can be normalized using certain normalization algorithms so as to avoid abnormalities such as non-additive joins and other problems. Additionally, these normalization algorithms include Boyce-Codd Normal Form or some other normalization, optimization algorithm known in the art.

Figure 18:
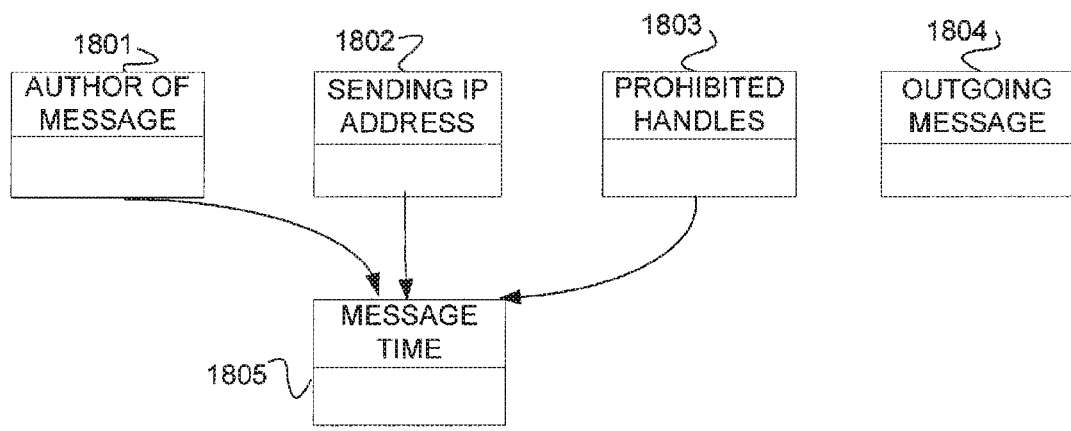
FIG. 18 is an example Relational Database Schema (RDS).

FIG. 18 is an example relational database schema 1800. Described is an author of message table 1801 that contains various types of data relating to the author of a particular video mail message including, for example, the authors handle, actual name or other relevant data. Also illustrated is a database table 1802 that records the sending IP address such that the sender of the video mail message and their IP address may be recorded. Also recorded, in some embodiments, in this table is the Media Access Control (MAC) address, or other type of signifier used to uniquely signify the sender of a video mail message. Also described is a table 1803 titled prohibited handles. In this table 1803 are those individuals, or senders or initiators of video mail messages, who are prohibited from sending a video mail message to the recipient. This information may include the aforementioned IP address of the sender, MAC address of the sender or other information. Also illustrated is an outgoing message table 1804 used to record an outgoing message for the user. This outgoing message, in some cases, may be a text message and/or an audio and video message that may be specific to a particular initiator or sender of the video mail message. Put another way, in some embodiments, an outgoing message may be tailored to the particular initiator or sender of the video mail session. Also depicted is a table 1805 titled message time. In some embodiments, the message time may serve as a constraint for the relational data schema 1800 such that the message time data contained in the table 1805 acts to make unique each received video mail message and data relating to each message unique. Contained also in this message time table 1805 may be the actual video mail message. With regard to the various types of data stored in these various tables (e.g., 1801, 1802, 1803, 1804, 1805), these data types may include, for example, a BLOB which will be a data type used to, for example, store an outgoing video mail message or an incoming data mail message. Other data types may include integers used to store IP addresses and MAC addresses, strings used to store the handle or signifier of a private user, or other types of data types known in the art.

Component Design

Some example embodiments may include the above described three tiers or levels being written as one or more software modules with each module contributing to the functionality of each level or tier. Common to many of these modules is the ability to generate, use and manipulate the above described data and data sets. These modules, and associated functionality, may be used by the client, server, or peer applications. These various modules can be implemented into the system on an as-needed basis. These modules may be written in an object-oriented-computer language such that a component oriented or object-oriented programming technique can be implemented using a Visual Component Library (VCL), Component Library for Cross Platform (CLX), Java Beans (JB), Java Enterprise Beans (EJB), Component Object Model (COM), or Distributed Component Object Model (DCOM) or other suitable technique. These modules are linked to other modules via various APIs and then compiled into one complete server and/or client application. The process for using modules in the building of client and server applications is well known in the art. Further, these modules, and the tiers that they make up, are linked together via various distributed programming protocols as distributed computing modules.

Distributed Computing Modules

Some example embodiments may include remote procedure calls being used to implement one or more of the above described levels of the three-tier architecture across a distributed programming environment. For example, a logic level resides on a first computer system that is remotely located from a second computer system containing an Interface or storage level. These first and second computer systems can be configured in a server-client, peer-to-peer or some other configuration. These various levels can be written using the above described component design principles and can be written in the same programming language, or a different programming language. Various protocols are implemented to enable these various levels, and components contained therein, to communicate regardless of the programming language used to write these components. For example, a module written in C++ using the Common Object Request Broker Architecture (CORBA) or Simple Object Access Protocol (SOAP) can communicate with another remote module written in Java. These protocols include SOAP, CORBA, or some other suitable protocol. These protocols are well-known in the art.

A System of Transmission Between a Server and Client

In some embodiments, the above described components that make up the platform architecture communicate using the Open Systems Interconnection Basic Reference Model (OSI) or the Transmission Control Protocol/Internet Protocol (TCP/IP) protocol stack models for defining network protocols that facilitate the transmission of data. Applying these models, a system of data transmission between a server and client computer system can be described as a series of roughly five layers comprising as a: physical layer, data link layer, network layer, transport layer and application layer. Some example embodiments may include the various levels (e.g., the Interface, Logic and storage levels) residing on the application layer of the TCP/IP protocol stack. The present application may utilize a Hyper Text Transfer Protocol (HTTP) to transmit content between the server and client applications, whereas in other embodiments another protocol known in the art is utilized. Content from an application residing at the application layer is loaded into the data load field of a TCP segment residing at the transport layer. This TCP segment also contains port information for a recipient application or a module residing remotely. This TCP segment is loaded into the data field of an IP datagram residing at the network layer. Next, this IP datagram is loaded into a frame residing at the data link layer. This frame is then encoded at the physical layer and the content transmitted over a network such as an internet, Local Area Network (LAN) or Wide Area Network (WAN). The term internet refers to a network of networks. Such networks may use a variety of protocols for exchange of information, such as TCP/IP etc., and may be used within a variety of topologies or structures. This network may include a Code Sensing Multiple Access Network (CSMA) such as an Ethernet based network. This network may include a Code Divisional Multiple Access (CDMA) network or some other suitable network.

A Computer System

Figure 19:
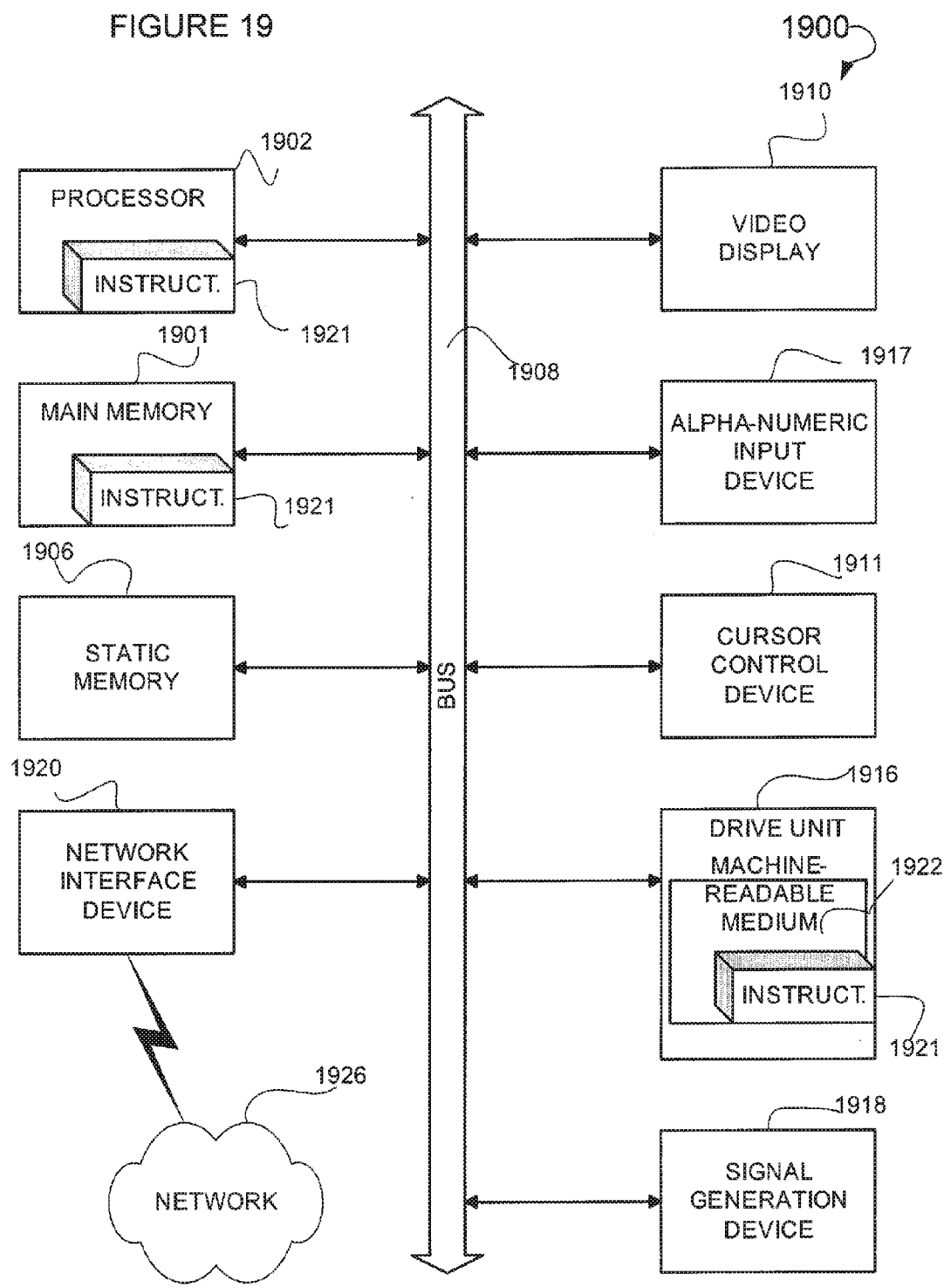
FIG. 19 shows a diagrammatic representation of a machine in the example form of a computer system.

FIG. 19 shows a diagrammatic representation of a machine in the example form of a computer system 1900 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network, both perform tasks. In a distributed system environment, program modules may be located in both local and remote memory-storage devices (see below).

The example computer system 1900 includes a processor 1902 (e.g., a Central Processing Unit (CPU), a Graphics Processing Unit (GPU) or both), a main memory 1901 and a static memory 1906, which communicate with each other via a bus 1908. The computer system 1900 may further include a video display unit 1910 (e.g., a Liquid Crystal Display (LCD) or a Cathode Ray Tube (CRT)). The computer system 1900 also includes an alphanumeric input device 1917 (e.g., a keyboard), a User Interface (UI) cursor controller 1911 (e.g., a mouse), a disc drive unit 1916, a signal generation device 1918 (e.g., a speaker) and a network interface device (e.g., a transmitter) 1920.

The disc drive unit 1916 includes a machine-readable medium 1922 on which is stored one or more sets of instructions and data structures (e.g., software) embodying or utilized by any one or more of the methodologies or functions described herein. The software may also reside, completely or at least partially, within the main memory 1901 and/or within the processor 1902 during execution thereof by the computer system 1900, the main memory 1901 and the processor 1902 also constituting machine-readable media.

The instructions 1921 may further be transmitted or received over a network 1926 via the network interface device 1920 utilizing any one of a number of well-known transfer protocols (e.g., HTTP, SIP).

While the removable physical storage medium 413 is shown in an example embodiment to be a single medium, the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies described herein. The term "machine-readable medium" shall accordingly be taken to include, but not be limited to, solid-state memories, optical and magnetic medium, and carrier wave signals.

Marketplace Applications

In some embodiments, video mail could be used in the buying or selling of goods and services over the internet. For example, a buyer of a good or service could leave a video mail message informing a seller of their intent to buy. This video mail message could inform the seller/receiver of the intent of the buyer to purchase and the details of this intent to purchase. In many cases, the ability to see the party with whom one is transacting business will help to facilitate the transaction of goods or services.

Figure 20:
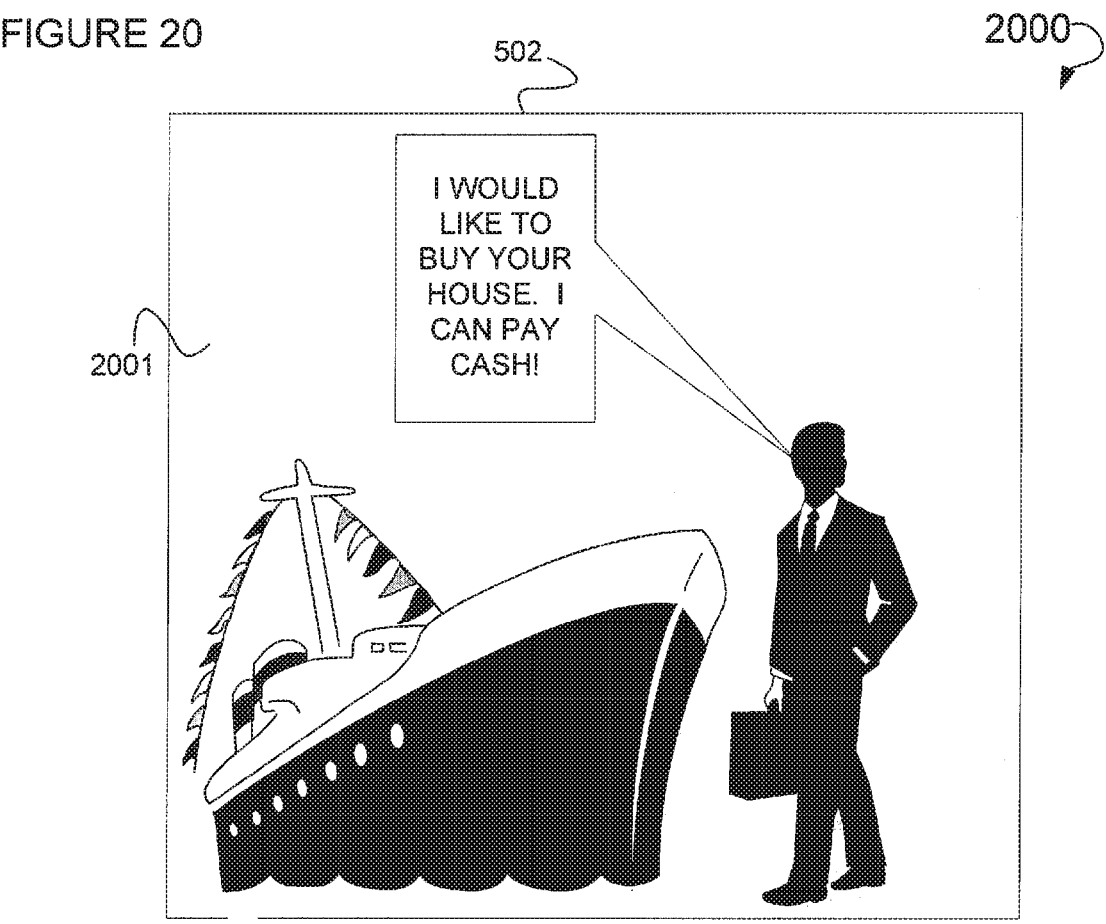
FIG. 20 is a screen shot illustrating an example display screen containing digital content in the form of a video mail message from a potential buyer.

FIG. 20 is an example screen shot 2000 illustrating a display screen 502 containing digital content 2001 in the form of a video mail message. Here, the digital content 2001 illustrates the intent, if not ability, of a buyer to purchase a house. The buyer is able to describe his intent (e.g., "I would like to buy your house. I can pay cash!"), and his ability is alluded to by his placement next to a large yacht.

Some example embodiments may include the posting of an outgoing video mail message describing a good or service for sale. For example, a seller of a good or service could post an outgoing video mail message showing the item for sale in actual use. A car being driven, a boat being captained, or a plane being piloted are all things that could be shown with an outgoing video mail message. In many cases, an outgoing video mail message showing the good or service for sale could help to facilitate a sale.

Figure 21:
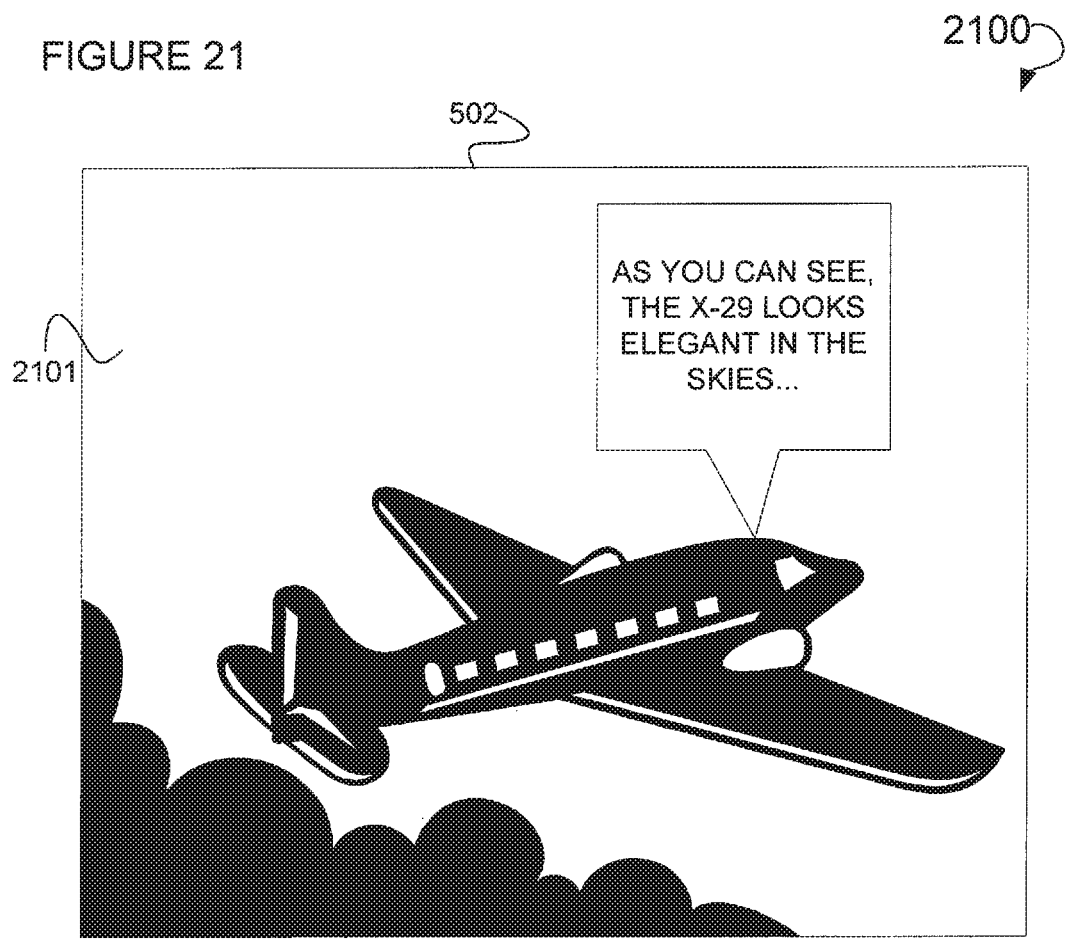
FIG. 21 is a screen shot illustrating an example display screen containing digital content in the form of a video mail message from a potential seller.

FIG. 21 is an example screen shot 2100 illustrating a display screen 502 containing digital content 2101 in the form of a video mail message. In this example, a seller is able to post an outgoing video mail message as digital content 2101 describing the good (e.g., an airplane) being sold. Additionally, the seller is able to post an audio description of this good (e.g., "As you can see, the X-29 looks elegant in the skies . . . ").

In some example embodiments, a video mail message could be used by either a seller or buyer of good and services to generate a video mail message regarding their buying or selling experience. For example, an outgoing video mail message may instruct potential buyers on the advantages of buying from the seller. And again, a video mail message from a buyer to a seller could instruct the seller on the advantages or disadvantages of using the seller to transact the sale or good or services, and could also be used for the purpose of providing testimonials regarding the buying experience.

Figure 22:
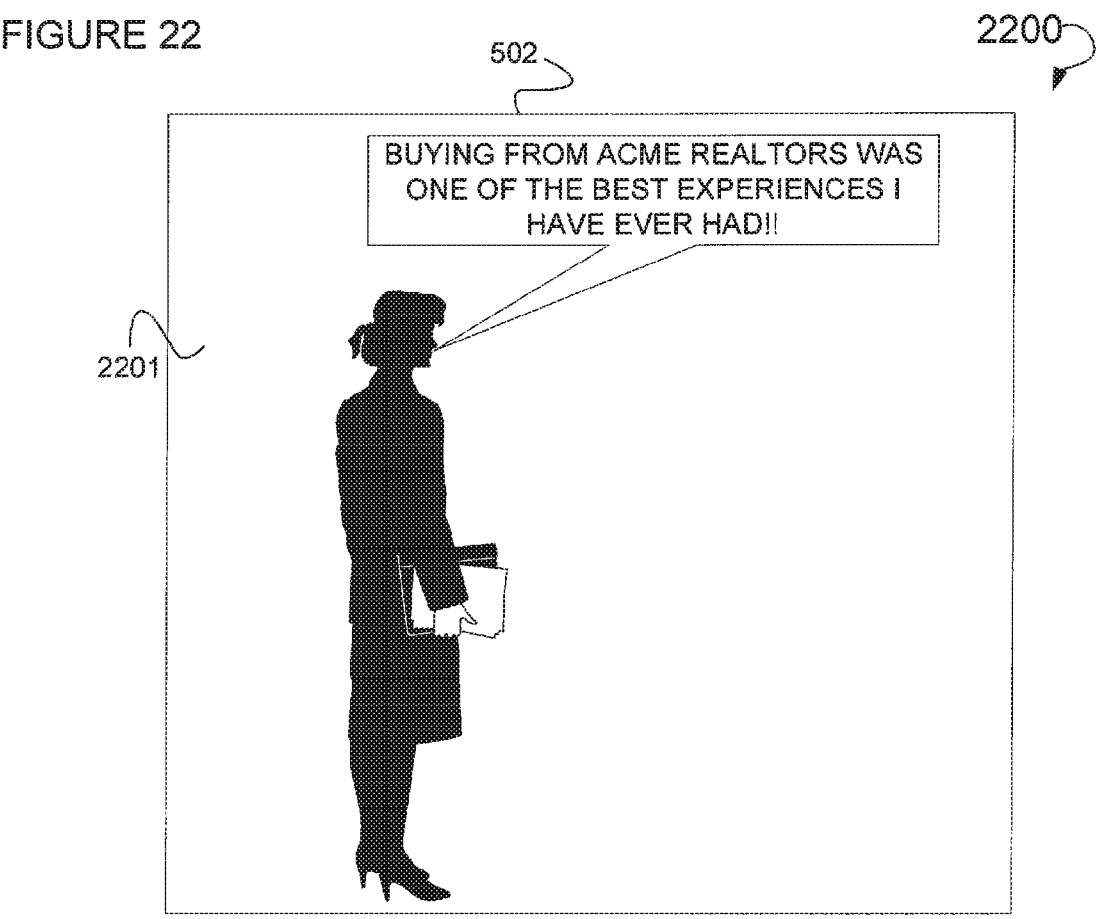
FIG. 22 is a screen shot illustrating an example display screen containing digital content in the form of a video mail message providing testimonial information regarding a product for sale.

FIG. 22 is an example screen shot 2200 illustrating a display screen 502 containing digital content 2201 in the form of a video mail message. In this example, the digital content 2201 provides a testimonial, wherein potential buyers are instructed as to others' buying experiences using the seller. More to the point, the buyer makes an audio/video testimonial statement (e.g., "Buying from Acme Realtors was one of the best experiences I have ever had!!").

In further example embodiments, video mail could be used by senders or receivers to send video mail greetings to one another. These video mail greeting could be personalized such that, for example, a recipient could see and hear those characteristics that make the sender unique and novel. Additionally, video mail greetings allow for senders to express emotions and sentiments that are not as easily expressed with other forms for greetings.

Figure 23:
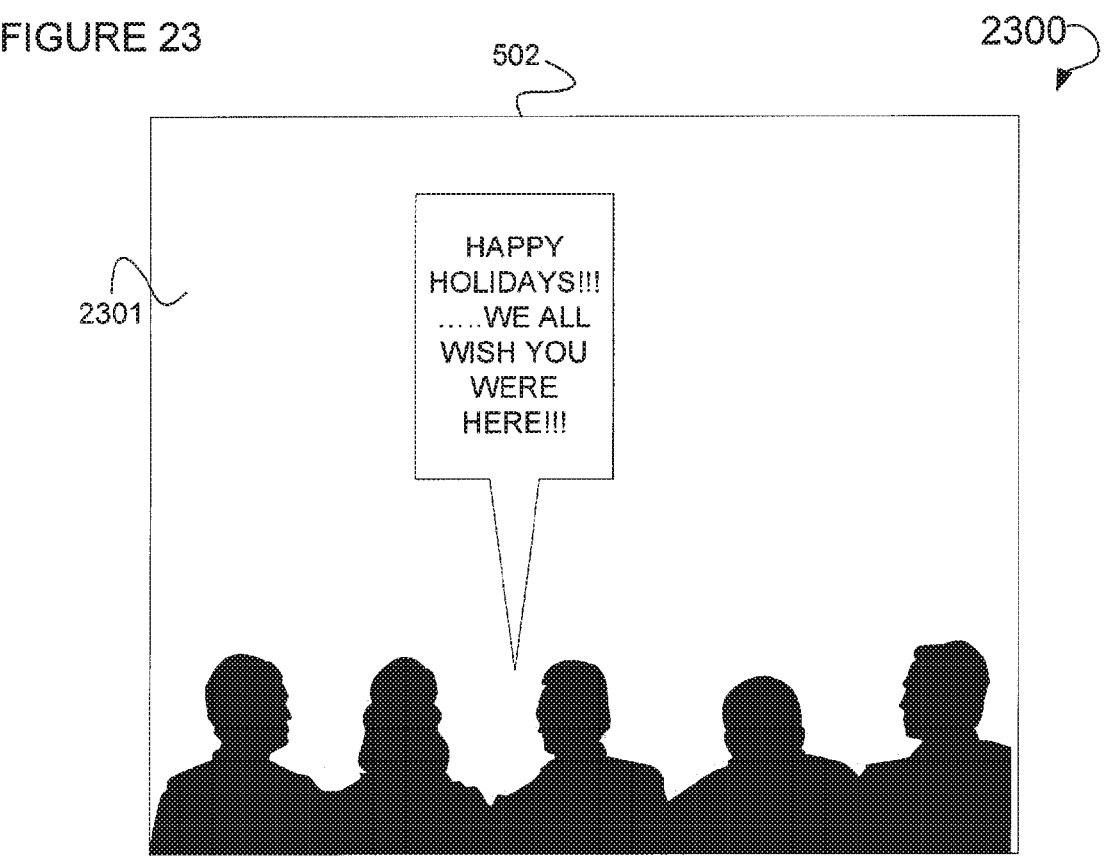
FIG. 23 is a screen shot illustrating an example display screen containing digital content in the form of a video mail message providing a greeting.

FIG. 23 is an example screen shot 2300 illustrating a display screen 502 containing digital content 2301 in the form of a video mail message. Here a holiday greeting video mail message is sent in the form of digital content 2301. This digital content is audio/video content from, for example, family members making a holiday greeting (e.g., "Happy holidays!!! . . . . we all wish you were here!!!").

In some embodiments, video mail could prove useful in one's daily life. For example, many times audio/video records such as those implemented using video mail, allow for senders and receivers of video mail to convey feelings, emotion, and even their demeanor not otherwise conveyed. Video mail will allow senders and recipients to capture emotions.

Figure 24:
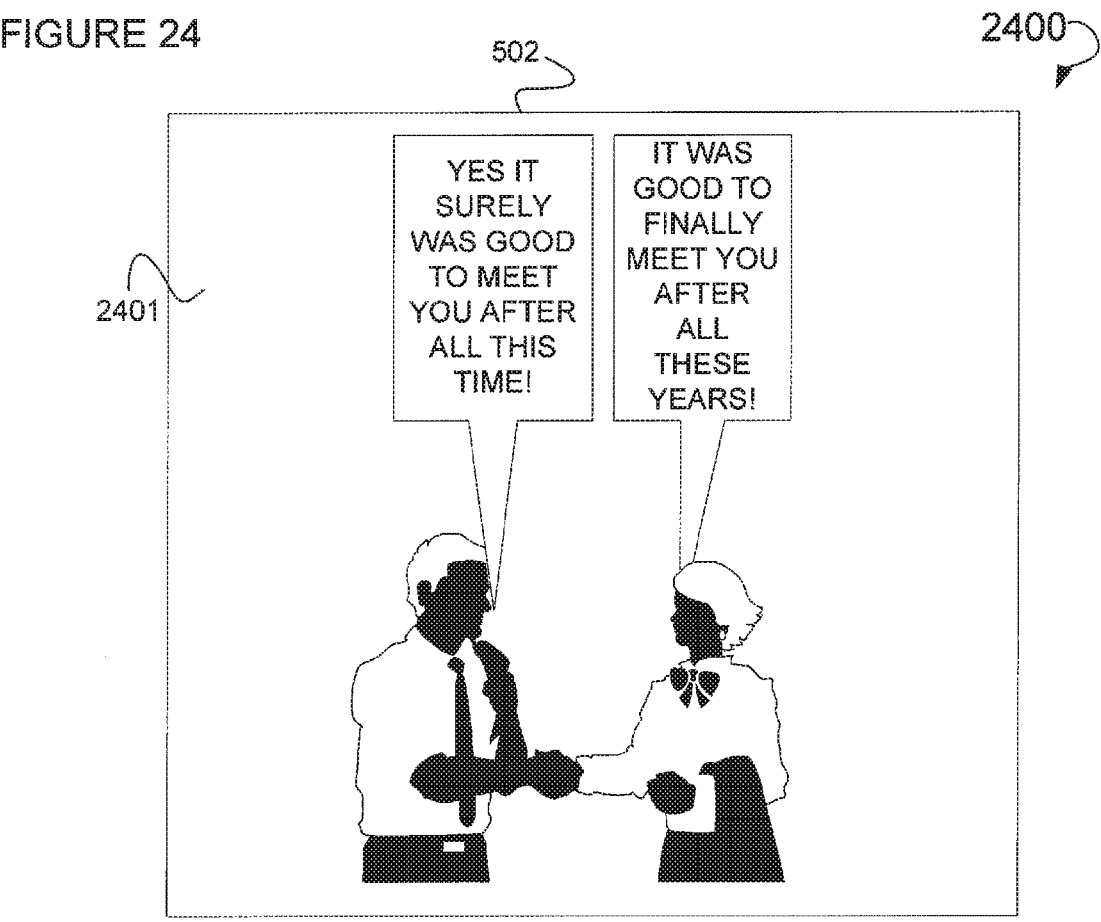
FIG. 24 is a screen shot illustrating an example display screen containing digital content in the form of a video mail message memorializing a significant event.

FIG. 24 is an example screen shot 2400 illustrating a display screen 502 containing digital content 2401 in the form of a video mail message. This example digital content 2401 allows senders to present their demeanor and feelings accompanied by dialog (e.g., "Yes it surely was good to meet you after all this time!" "It was good to finally meet you after all these years.").

In some embodiments, a system is illustrated including a first computer system operatively coupled to a second computer system, wherein the first and second computer systems are in a peer-to-peer configuration, a receiver residing on the second computer system to receive a video mail message, and a storage device residing on the second computer system to store the video mail message. The system may further include a first device operatively coupled to the first computer system, wherein the first device receives an audio signal, a second device operatively coupled to the first computer, wherein the first device receives a video signal, and a transmitter operatively coupled to the first computer system to transmit a video signal. Moreover, the system may further include the transmitter operatively coupled to the first computer system to transmit an audio signal. Additionally, the system may include a receiver operatively coupled to the first computer system to receive a prompt to leave a message. Furthermore, the prompt may be a prompt selected from the group consisting of an outgoing audio/video message, screen icon, and text message. In addition, the recorder may be operatively coupled to the second computer system and the recorder records a video signal and an audio signal.

Some example embodiments may include a method comprising configuring a first computer system and a second computer system into a peer-to-peer configuration, receiving a video mail message at the second computer system, and storing the video mail message on the second computer system. The method may further include receiving an audio signal on the first computer system, receiving a video signal on the first computer system, and transmitting the video signal using the first computer system. Moreover, the method may further include transmitting an audio signal using the first computer system. In addition, the method may further comprise receiving a prompt to leave a message from the second computer system, wherein the prompt is a prompt selected from the group consisting of an outgoing audio/video message, screen icon, and text message. Additionally, the method may further include recording a video signal, and recording an audio signal. The method may further include recording an outgoing message. Additionally, the method may further comprise checking the signifier of the first computer system, checking memory space of the second computer system, and checking the operability of devices residing on the second computer system, wherein the devices are devices selected from the group consisting of a video camera and a microphone. Further, a signifier may be selected from the group consisting of user handles, internet protocol address, media access control address, and user name.

In some embodiments, a computer-readable medium embodying instructions is illustrated, the instructions including a first set of instructions to configure a first computer system and a second computer system into a peer-to-peer configuration, a second set of instructions to receive a video mail message at the second computer system, and a third set of instructions to store the video mail message on the second computer system.

In some embodiments, an apparatus is illustrated as including means for configuring a first computer system and a second computer system into a peer-to-peer configuration, means for receiving a video mail message at the second computer system, and means for storing the video mail message on the second computer system.

It is to be understood that the above description is intended to be illustrative and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   an audio capture device configured to generate audio data based on a detected audio signal;
   a video capture device configured to generate video data based on a detected video signal;
   an encoding module operatively coupled to the audio capture device and to the video capture device, the encoding module comprising a processor of a machine, to format, using a video encoding protocol, the audio data and the video data as a media stream;
   a decisional module to verify that a recipient computer system has available memory capacity based on a determination that an identifier of the machine is on an allowed list of the recipient computer system, the recipient computer system being communicatively coupled to the system via a communication network, the decisional module further to verify that one or more devices residing on the recipient computer system are enabled; and
   a transmitter module to transmit, over the communication network, the media stream, using a standard Internet protocol, to the recipient computer system in response to verification that the recipient computer system has available memory space and that the one or more devices operating on the second computer system are enabled, the media stream being transmitted as one or more data packets to the recipient computer system utilizing a standardized packet format.

2. The system of claim 1, wherein the audio capture device is a microphone, and wherein the video capture device is a camera.

3. The system of claim 1, wherein the transmitter module is further to transmit instructions to the recipient computer system that causes the recipient computer system to store the media stream on a storage device of the recipient computer system.

4. The system of claim 1, further comprising a user interface module to execute a graphical user interface (GUI) that allows a user to select a signifier of the recipient computer system, the user interface module further to receive the selection of the signifier.

5. The system of claim 1, wherein the communication network is a distributed network.

6. The system of claim 1, wherein the encoding of the audio and video data is based on a Motion Picture Experts Group (MPEG) format.

7. A method comprising:
   receiving audio data from an audio capture device;
   receiving video data from a video capture device;
   formatting, using a video encoding protocol, the audio data and the video data as a media stream;
   verifying a recipient computer system has available memory capacity based on a determination that an identifier of a sending computer system is on an allowed list of the recipient computer system;
   verifying one or more devices residing on the recipient computer system are enabled; and
   transmitting, over a communication network, the media stream, using a standard Internet protocol, to the recipient computer system in response to verification that the recipient computer system has available memory space and that the one or more devices operating on the recipient second computer system are enabled, the media stream being transmitted as one or more data packets to the recipient computer system utilizing a standardized packet format.

8. The method of claim 7, further comprising
   transmitting instructions to the recipient computer system that causes the recipient computer system to store the media stream on a storage device of the recipient computer system.

9. The method of claim 7, further comprising storing the media stream in a network database in response to determining a buffer residing on the recipient computer system has been filled.

10. The method of claim 7, further comprising
    storing the audio data and video data on a local storage medium.

11. The method of claim 7, wherein the audio capture device is a microphone, and wherein the video capture device is a camera.

12. The method of claim 7, wherein recipient computer system comprise a cellular telephone.

13. The method of claim 7, wherein the standardized packet format is the real-time transfer protocol (RTP).

14. The method claim 7, further comprising:
checking a signifier of associated with the recipient computer system;
and signifying that the video stream may be stored, where the signifier is found to be valid.

15. The method of claim 7, wherein:
the communication network is a peer to peer network; and
the transmitting of the media stream is performed by an additional computer system coupled to the recipient computer system over the peer to peer network.

16. The method of claim 7, wherein the encoding of the audio data and the video data is based on a Motion Picture Experts Group (MPEG) format.

17. A non-transitory computer-readable medium embodying instructions which when executed by a process of the machine, cause the machine to perform operations comprising:
receiving audio data from an audio capture device;
receiving video data from a video capture device;
formatting, using a video encoding protocol, the audio data and the video data as a media stream;
verifying a recipient computer system has available memory capacity based on a determination that an identifier of the machine is on an allowed list of the recipient computer system;
verifying one or more devices residing on the recipient computer system are enabled; and
transmitting, over a communication network, the media stream, using a standard Internet protocol, to the recipient computer system in response to verification that the recipient computer system has available memory space and that the one or more devices operating on the recipient computer system are enabled, the media stream being transmitted as one or more data packets to the recipient computer system utilizing a standardized packet format.

18. The non-transitory computer-readable medium of claim 17, further embodying instructions that when executed cause the processor to execute a graphical user interface (GUI) that allows a user to select a signifier of the recipient computer system, the user interface module further to receive the selection of the signifier.

19. The non-transitory computer-readable medium of claim 18, further embodying instructions that when executed cause the processor to store the video stream on an additional computer system, the additional computer system to identify the recipient computer system based on the signifier.

* * * * *